United States Patent [19]

Takahashi et al.

[11] Patent Number: 5,513,356

[45] Date of Patent: Apr. 30, 1996

[54] INFORMATION PROCESSING SYSTEM FOR OBTAINING DESIRED PROCESSING BASED UPON OUTPUT SPECIFICATIONS INPUT BY USER

[75] Inventors: Tsutomu Takahashi; Kazuhiro Sugino; Wakako Oguruma; Hisashi Onari, all of Yokohama, Japan

[73] Assignee: Hitachi, Ltd., Tokyo, Japan

[21] Appl. No.: 688,279

[22] Filed: Apr. 22, 1991

[30] Foreign Application Priority Data

Apr. 20, 1990 [JP] Japan .................................. 2-102933

[51] Int. Cl.⁶ ............................. G06F 15/16; G06F 19/00
[52] U.S. Cl. ................ 395/700; 364/972.2; 364/974.4; 364/948.2; 364/972.3; 364/DIG. 2; 364/221.9; 364/226.7; 364/DIG. 1; 364/468; 395/650
[58] Field of Search ........................... 364/972.2, 974.4, 364/948.3, 972.3, 221.9, 226.7, 468; 395/650, 700

[56] References Cited

U.S. PATENT DOCUMENTS

| | | | |
|---|---|---|---|
| 4,658,370 | 4/1987 | Erman et al. | 364/900 |
| 4,870,590 | 9/1989 | Kawata et al. | 364/468 |
| 4,949,253 | 8/1990 | Chigira et al. | 364/200 |
| 5,038,296 | 8/1991 | Sano | 364/200 |
| 5,040,123 | 8/1991 | Barber et al. | 364/468 |
| 5,050,074 | 9/1991 | Marca | 364/DIG. 1 |
| 5,089,970 | 2/1992 | Lee et al. | 364/468 |
| 5,151,984 | 9/1992 | Newman et al. | 395/500 |
| 5,159,687 | 10/1992 | Richburg | 395/700 |
| 5,261,103 | 11/1993 | Takeuchi et al. | 395/700 |

OTHER PUBLICATIONS

"Data Engineering", Third International Conference on Data Engineering, Feb. 1987, IEEE Computer Society, pp. 173–180.

"Generation of File Processing Programs Based on JSP", Engmann, et al, 8239 Software Practice and Experience, Apr. 1989, No. 4, pp. 393–409.

"A Spreadsheet Interface for Logic Programming", Spenke, et al, Sigchi Bulletin, Conference on Human Factors in Computing Systems, May 1989, pp. 75–80.

William Baker, Advanced Military Computing, 28 Aug. 1989, V. 5 No. 18, The title of the article is, "Air Force AI Applications Multiply".

Carvalho et al, "An Integrated Environment for Planning and Scheduling in Flow–Shop Manufacturing Plants" IEEE, 1990, pp. 55–62.

Mori et al, "Cooperative Scheduling Environment Based on Editing and Simulation for Manufacturing Systems", IEEE, 199 pp. 557–559.

Kim et al, "A Knowledged–Based Expert Systems Approach to Schedule–Based Material Requirements Planning," IEEE, 1990, pp. 98–101.

(List continued on next page.)

Primary Examiner—Kevin A. Kriess
Assistant Examiner—Michael T. Richey
Attorney, Agent, or Firm—Antonelli, Terry, Stout & Kraus

[57] ABSTRACT

In an information processing systems a procedure to be processed is divided into a plurality of basic processing units and those basic processing units are stored in the system. The system further creates and stores processing unit information for each of the stored basic processing units, the processing unit information including a name of processing executed in each processing unit, an input table required by the processing unit, and an output table outputted by the processing unit. When an operator inputs data about a desired output table format, the information processing system selects the most suitable processing unit information (knowledge) compatible with the desired output table format. From the selected processing unit information, the other relevant processing unit information is selected. By repeating a similar flow, the system traces back the flow of the processing from the output table for searching the processing unit information group. Then, the system connects the processing units related to the searched processing unit information group in the sequence of the processing flow for the purpose of building a desired procedure. The searching and building process is indicated to the operator so that the operator can change a parameter and/or re-build the procedure, if necessary.

22 Claims, 40 Drawing Sheets

OTHER PUBLICATIONS

John McCormick, "Project Management Software: Don't Strain Resources, Pull Together All the Links", Government Computer News May 28, 1990 v9 n11 p67(3).

Charles Levy, "Best Project Management", Which Computer? Jul. 1989 p42 (8).

Lois Slavin, "Structuring Project Plans to Cash in on Innovation", Digital Review Dec. 11, 1989 v6 n49 p35 (8).

"Project–Management Software with Graphical User Interfaces", PC Week Mar. 26, 1990 v7 n112 p92 (1).

Harvey A. Levine, "Two Separate Worlds Moving Slowly Closer", Software Magazine Mar. 1989 v9 n3 p32 (8).

Naor Wallach, "MacProject II V 2.0", Newsbytes Aug. 29, 1989.

Ken Landis, "Critical Paths", MacUser Oct. 1989 v5 n10 p162 (9).

Dennis Livingston, "Navy Signals for CIM", Systems Integration Jan. 1990 v23 n1 p54 (5).

Ken Landis, "Key Plan", MacUser Apr. 1990 v6 n4 p59 (1).

FIG. 6
PRIOR ART

| | OPERATING ROUTINE FOR PRODUCTION MANAGING SYSTEM | NECESSARY EXPERTISE | |
|---|---|---|---|
| | | PRODUCTION MANAGEMENT | INFORMATION PROCESSING |
| 1 | RECOGNITION OF PROBLEM ABOUT PRODUCTION MANAGEMENT | ◯ | |
| 2 | DEFINITION OF OUTPUT REQUIRED FOR SOLVING THE PROBLEM | ◯ | |
| 3 | SELECTION OF USER PROGRAM | | ◯ |
| 4 | PREPARATION OF INPUT DATA | | ◯ |
| 5 | DEFINITION OF PROCEDURE | | ◯ |
| 6 | EXECUTION OF PROCESSING | | ◯ |
| 7 | INTERPRETATION OF OUTPUT RESULT | ◯ | |

FIG. 8

| KNOWLEDGE ABOUT OUTPUT PROCESSING OF TABLE A | |
|---|---|
| TABLE NAME | A |
| TRANSLATION NAME | P1, P2 ---- |
| INPUT TABLE | T1, T2 |
| ITEM NAME | K1, K2, K3 ---- |
| UNIT NAME | U1, U2, U3 ---- |
| OPERATING FORMULA | K1 = K2 + 1 = Kn, ---- |

| No. | NAME OF FUNCTION | NAME OF COMMAND | |
|---|---|---|---|
| 1 | PART EXPLOSION | EXPLODE 2 TYPES (2) | CALCULATION OF THE NUMBER OF COMPONENT PARTS AND TIME REQUIRED FOR EACH INPUT LOT (PRODUCT, QUANTITY, TIME LIMIT) IN A PRODUCTION PLAN |
| 2 | SETTING OF LOT | LOTSIZE 4 TYPES (4) | GROUPING OF LOTS FOR SAME ORDERED PRODUCT OR DIVISION OF LOTS FOR PREPARATION OF JOB ORDERS |
| 3 | DEVELOPMENT OF PROCESS STEPS | ROUTE 1 TYPE (1) | DETERMINATION OF SEQUENCE AND CONDITIONS REQUIRED FOR EXECUTION OF JOB ORDERS |
| 4 | INVENTORY CHECK | LOCATE 4 TYPES (4) | COLLATION OF A QUANTITY OF ARTICLES (PARTS) REQUIRED FOR EXECUTING JOB ORDERS WITH THE TOTAL STOCK, CALCULATION OF NET QUANTITY AS REQUIRED OR DETERMINATION OF SUFFICIENT OR INSUFFICIENT STOCK |
| 5 | LOAD PROCESS EN BLOCK | LOAD 8 TYPES (6) | LOAD PROCESSING EN BLOCK FOR DETERMINATION OF THE NUMBER OF PROCESS STEPS FOR MAIN RESOURCE (EQUIPMENT, WORKERS) IN A TIME SPAN BETWEEN DELIVERY DATE AND STARTING DATE SET BY JOB ORDER |
| 6 | JOB SEQUENCE | SEQUENCE 4 TYPES (3) | DETERMINATION OF PRIORITY OF JOB ORDERS IN ACCORDANCE WITH ESTABLISHED RULE |
| 7 | START SEQUENCE | SEQSET 1 TYPE (0) | FOR JOB ORDERS EACH INVOLVING A SINGLE STEP, START SEQUENCE OF JOB ORDERS IS SO DETERMINED THAT THE TOTAL SUM OF PROGRAMMED VALUES THEREOF IS MINIMUM |
| 8 | LINE SEQUENCE | SEQLINE 1 TYPE (0) | IN CASE OF LINE WORKS, SEQUENCE IN WHICH CERTAIN JOB ORDERS ARE EXECUTED IN LINE IS DETERMINED SO THAT THE MAXIMUM RATE OF OPERATION IS REALIZED |
| 9 | PREPARATION COMMAND | RELEASE 1 TYPE (1) | FOR INPUT JOB ORDER, INSTRUCTION COMMANDING PREPARATION FOR STARTING JOB IS ISSUED |
| 10 | START COMMAND | DISPATCH 5 TYPES (4) | JOBS HAVING PROCEEDED TO DESIGNATED STEPS ARE WEIGHTED IN ORDER IN ACCORDANCE WITH FIVE RULES TO ISSUE CORRESPONDING START COMMANDS |
| 11 | COLLECTION OF ACHIEVEMENTS | COLLET 1 TYPE (1) | ACHIEVEMENTS DATA INPUT FROM FLOPPY DISK OR KEYBOARD ARE STORED IN ACHIEVEMENT DATA TABLE |
| 12 | SIMULATION OF JOB | SIMULATE 1 TYPE (1) | FOR ESTIMATING TIME TAKEN FOR EXECUTING EACH PROCESS STEP WITH ACCURACY, SIMULATION IS CONDUCTED ON THE ASSUMPTION THAT RESOURCE DESIGNATED BY JOB ORDER LIST IS OCCUPIED FOR A DESIGNATED TIME, TO DERIVE DATA OF ACHIEVEMENTS |
| 13 | UPDATING OF PROCESS | PROGRESS 1 TYPE (1) | ON THE BASIS OF ACHIEVEMENTS DATA, PROGRESS IN PRODUCTION FOR JOB ORDERS IS UPDATED BY RECORDING STEP STARTING AND TIMES AS WELL AS PART ARRIVAL AND LEAVING TIMES |
| 14 | MONITORING OF PROGRESS | MONITOR 2 TYPES (2) | BY PROCESSING ACHIEVEMENT DATA CONCERNING DESIGNATED ORDER CODE OR STEP CODE, PROGRESS OF ORDERED JOB OR ORDER BEING EXECUTED IS OUTPUT |
| 15 | COLLECTION OF ACHIEVEMENTS | MEASURE 4 TYPES (4) | BY PROCESSING ACHIEVEMENTS DATA OVER A DESIGNATED PERIOD, DESIGNATED CONTENTS SUCH AS THE RATE OF OPERATION ARE SUMMED UP |
| | IN TOTAL | 40 TYPES (34) | FIGURES IN ( ) INDICATE THE NUMBER OF REALIZED COMMANDS |

FIG. 16A

| | | |
|---|---|---|
| DEFINITION OF DATA | ACQUIRE<br>CREATE<br>DROP<br>ALTER<br>COMMENT | ACQUIRING OF DATA BASE AREA<br>PREPARATION OF TABLE, INDEX, etc.<br>DELETION OF TABLE, INDEX, etc.<br>ADDITION OF COLUMN TO TABLE<br>SUPPLEMENT OF COMMENT |
| HANDLING OF DATA | SELECT<br>INSERT<br>UPDATE<br>DELETE | RETRIEVE OF DATA (TABLE TRANSLATION)<br>PREPARATION OF DATA (TABLE TRANSLATION)<br>UPDATING OF DATA (TABLE TRANSLATION)<br>DELETION OF DATA |
| CONTROL | CONNECT<br>EXIT | START OF EXECUTION<br>END OF EXECUTION |
| INPUT/OUTPUT OF DATA | INPUT<br>DATALOAD<br>DATAOUT | INPUT OF DATA<br>INPUT OF DATA FROM EXTERNAL FILE<br>OUTPUT OF DATA TO EXTERNAL FILE |
| DISPLAY | DISPLAY<br>CHART | DISPLAY OF TABLE, INTERNAL VARIABLES, etc.<br>DISPLAY OF BAR GRAPH |
| CURSOR | DECLARE<br>OPEN<br>FETCH<br>REPLACE<br>CLOSE | DECLARATION OF CURSOR<br>OPENING OF CURSOR<br>FETCHING OF ONE SET OF DATA<br>UPDATING OF DATA<br>CLOSING OF CURSOR |
| INTERNAL VARIABLES | CREATE<br>SET | DECLARATION AND INITIALIZATION OF INTERNAL VARIABLES<br>ALTERATION OF VALUES OF INTERNAL VARIABLES AND COLUMNS (SUBSTITUTION) |

FIG. 16B

| | | |
|---|---|---|
| CONTROL OF SEQUENCE OF EXECUTION | DO | CALL OF MACRO-COMMAND |
| | IF | EXECUTION OF COMMAND THROUGH CONDITIONAL BRANCHING |
| | WHILE | "WHILE" LOOP |
| | REPEAT | "REPEAT" LOOP |
| | BREAK | END OF LOOP |
| | LOOP | PROCEEDS TO NEXT LOOP |
| | RETURN | END OF EXECUTION OF MACRO-COMMAND |
| | PROC | DEFINITION OF MACRO-COMMAND |
| IMAGE CONTROL | ERASE | ERASING OF IMAGE |
| | READ | DATA INPUT FROM IMAGE |
| | WRITE. ? | DATA DISPLAY ON IMAGE |
| AUXILIARY | HELP | ELUCIDATION OF COMMAND |
| EXECUTION OF COMMAND CORRECTION | L | DISPLAY OF COMMAND |
| | F | SEARCH OF CHARACTER STRING |
| | C | REPLACEMENT OF CHARACTER STRING |
| | M | MOVEMENT OF POINTER |
| | G | EXECUTION |
| | S | SKIP |
| | A | STOP |
| | N | INTERRUPT EXECUTION OF NEW COMMAND |
| FUNCTION | FROM TRANSFORMATION PROCESSING OF CHARACTER STRING | |
| | EOF | |
| | CHECK OF CONDITIONS | |
| | MAXIMUM / MIMIMUM | |
| | OTHERS | |

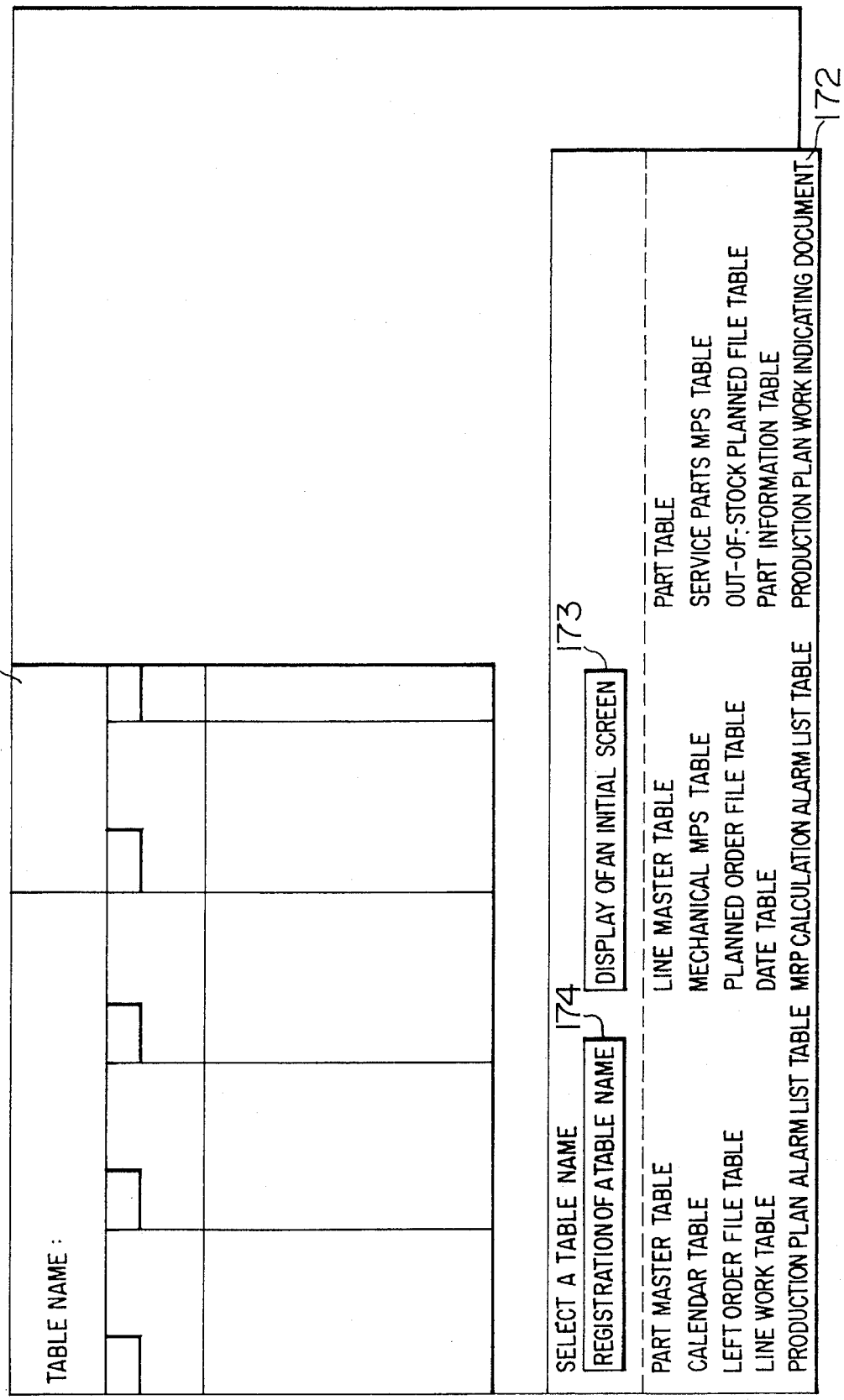

FIG. 18

TABLE NAME: PART REQUIREMENT TABLE
181
182 PART NAME
183 SCHEDULED QUANTITY
184 QUANTITY
3 YEAR, MONTH, DAY DUE DATE

SPECIFY AN ITEM AND UNIT TO BE MODIFIED
185 MODIFICATION ENDS
186 ADDITION OF ITEM AND UNIT

FIG. 19

TABLE NAME : PART REQUIREMENT TABLE

| 1 | 2 PART NAME | 3 QUANTITY SCHEDULED QUANTITY | 4 YEAR,MONTH,DAY DUE DATE |
|---|---|---|---|
| 193 | | | |

SELECT AN ITEM NAME — 192

[REGISTRATION OF AN ITEM NAME]    [TERMINATION OF ITEM MODIFICATION] — 194

191

| INITIAL SETUP TIME | CAPACITY | START |
| END | PRIORITY | SPEED ACHIEVEMENT |
| WORKING RATIO | NET TIME | LOT NO. |
| G SIZE | E TIME | K SIZE |
| G ACCUMULATION | E ACCUMULATION | K-G ACCUMULATION |

FIG. 20

TABLE NAME : PART REQUIREMENT TABLE

| 1 | 2 | 3 | 4 |
|---|---|---|---|
| LOT NO. | PART NAME | QUANTITY<br>SCHEDULED QUANTITY | YEAR, MONTH, DAY<br>DUE DATE |
| | | | |
| | | | |

SELECT A UNIT NAME

REGISTRATION OF A UNIT NAME  202   NO UNIT   203

| | | |
|---|---|---|
| SHEET | | MICRON |
| % | PERIOD | YEAR |
| MONTH | DAY | TIME |
| MINUTE | SECOND | TOTAL DAYS |
| MONTH DAY YEAR | YEAR MONTH DAY | PRODUCTS PER MONTH |

TABLE NAME : PART REQUIREMENT TABLE

| 1 | 2 | 3 QUANTITY | 4 YEAR MONTH DAY | 5 |
|---|---|---|---|---|
| LOT No. | PART NAME | SCHEDULED QUANTITY | DUE DATE | START |
| 6 | IC | 90 | 88-02-08 | 88- |
| 6 | CAPACITOR | 240 | 88-02-08 | 88- |
| 9 | IC | 90 | 88-02-08 | 88- |
| 9 | CAPACITOR | 240 | 88-02-08 | 88- |
| 10 | IC | 60 | 88-02-09 | 88- |
| 10 | CAPACITOR | 160 | 88-02-09 | 88- |
| 12 | IC | 105 | 88-02-09 | 88- |
| 12 | CAPACITOR | 280 | 88-02-09 | 88- |

272

PART REQUIREMENT TABLE → P01 → PART TABLE
                              ↓
                            LOT TABLE → P02 → PRODUCTION PLAN
                                              REFERENCE SCHEDULE

SELECT A PROCESSING ITEM
GRAPH DISPLAY
DISPLAY ENDS

271

PROCESSING NAME : DEVELOPMENT OF PARTS BY A PREDETERMINED AMOUNT

```
INSERT INTO buhiny (lotno8, buhin8, suryo8, nouki8, chday8, leve
    SELECT T1.lotno1, T2.buhin7, T1.suryo1, T1.noukl1,
        DATEADD(T1.nouki1, -T2.dayct7),; LEVEL
    FROM    lothyo T1  KEY = (seihn1),
            kijyun T2  KEY = (buhin7);
    WHERE   T1.lotno1 >= 6. AND.
            T2.buhin7 == 'IC'.OR.
            T2.buhin7 == 'CAPACITOR'. AND.
            '88-02-08'=<T1.nouki1 < '88-03-10' ;
    IF CARD ('buhiny')>0    THEN
```

FIG. 36

| ITEM NAME OF TRANS-LATED TABLE (371a) | UNIT OF TRANSLATED TABLE (371b) | ITEM NAME OF ORIGINAL TABLE (372a) | UNIT OF ORIGINAL TABLE (372b) | UNIT TRANSLATING PROCEDURE (TRANSLATION FORMULA) (373) |
|---|---|---|---|---|
| NUMBER OF COMPLETED PRODUCTS | QUANTITY | NUMBER OF COMPLETED LOT | LOT | NUMBER OF COMPLETION = NUMBER OF COMPLETED LOTS × NUMBER OF PRODUCTS IN ONE LOT NUMBER OF PRODUCTS IN ONE LOT = 25 (NUMBER OF PRODUCTS PER LOT) |
| PERIOD OF PRODUCTION | DAY | WORKING TIME | MINUTE | PRODUCTION DAYS = WORKING TIME ÷ WORKING TIME PER DAY WORKING TIME PER DAY = 480 (MINUTES/DAY) |
| DATE OF COMPLETION | TOTAL DAYS | PRODUCTION DAYS | DAY | COMPLETED DATE = START DATE + PRODUCTION DAYS STARTING DATE = 112 (TOTAL DAYS) |

F I G. 37

| 1 PART | 2 QUANTITY | 3 TOTAL DUE DATE | 4 MONTH DAY STARTING DATE |
|---|---|---|---|
| RESISTOR | QUANTITY= FIXED NUMBER | | |

TABLE NAME : PART REQUIREMENT TABLE — 381
383
382
384
385

INFORMATION PROCESSING SYSTEM FOR OBTAINING DESIRED PROCESSING BASED UPON OUTPUT SPECIFICATIONS INPUT BY USER

BACKGROUND OF THE INVENTION

The present invention relates to an information processing system, and more particularly to an information processing system which is adapted to perform an operation on data represented in a table format and to output the resulting data in a table format.

As can be appreciated from the frequently-used terms CIM (Computer Integrated Manufacturing) and FA (Factory Automation), manufacturing systems have become highly computerized Hence, there is a need for a production managing system designed to aid in planning and control of manufacturing. The conventional production managing systems usually require users to input data required for performing operations and parameters for controlling the flow of data processing. In other words conventional production managing systems require the proper specification (input) of a combination of data and parameters before starting data processing. However, the conventional production managing systems have been designed to only mechanically process data input by the users so that the systems require the users to have an extensive understanding of how the information processing system operates before using the information processing system. This is a disadvantageous feature of the conventional production managing systems.

Conventionally, the method for building and operating an information processing system in an office has been discussed in the paper "Method for Building an Office Information System According to Prepared Models", Proceedings of Information Processing Society, Vol. 25, No. 6, pp. 909–919 (1984), Uota, et. al.

This method is designed to analyze the information processing business in an office and divide the flow of information processing into a part (model) to be used in a wide range of business applications and a part (adapter) to be used for specific business applications. When creating the actual system by using these parts, an operator should select the proper model for the object business application and combine a specific adapter dedicated for the business application for the purpose of building the required information procedure. This technique, therefore, has an advantage that various information procedures can be easily created by taking into consideration various combinations of prepared models and adapters. The technique, however, has been proposed on the assumption that the operator must have a full understanding of the information procedure and build the overall processing system as he or she needs. The technique, hence, does not solve the disadvantage that the operator is required to know the operating method required to obtain the necessary output information.

As described above, conventional information processing systems require the users to have not only a knowledge of the business (for example, production management) but also a knowledge of the operating method of the information processing system, such as determination of the processing content, selection of a program to be used, preparation (creation or edition) of input data, and determination of the procedure. The knowledge of the operating method of the information processing system specifically includes knowledge about the computer hardware, the operating method of the computer, the software language, the programming method based on the software language, the structure of the database, the language for using the database, and so forth. The operator, hence, is required to have the foregoing knowledge before using the information processing system, and such knowledge is typically obtained by reading manuals for an object system or from lecture by a system designer or a dealer.

Further, an information processing system, including information processing for production management is necessary to precisely and quickly obtain a desired processing objective. Hence, it is necessary to build such an information processing system in such a way as to permit a user to freely change specifications of information processing, such as the processing content and an output format, and to provide the necessary information (output table) according to user needs. Moreover, the information processing system should to be designed so that the user can operate the information processing system only within his or her expertise.

The conventional information processing system, has a disadvantage that the system is difficult to use by anyone except an expert in software techniques and calculating methods (algorithms) and has a poor operating characteristic, that is, man-to-machine interface.

In order to overcome the foregoing disadvantage, that is, to improve the operating characteristic of the information processing system, a menu-guidance system has been widely used as a user interface. The menu-guidance system provides several menus (selecting items) so that the user can select the proper item according to the required processing and the input data. Hence, this menu-guidance system is capable of indirectly receiving a user's requirement. However, this system still requires the user to have a significant understanding of the input data and the processing content. Therefor, the production managing system for performing sophisticated operations may result in a break in data as a result of erroneous operation of the system by an unskilled user. This is a disadvantageous point of this menu-guidance system. This kind of menu-guidance system has been disclosed in JP-A-63-286921.

On the other hand, there is has been provided a computer software descriptive language (for example, MIMS manufactured by the General Electric Company) which is designed to build an information processing system (processing for translation of table-formatted data and which is capable of inputting table-formatted data in a file, as in the case of processing information for production management, performing less complicated calculations, such as a tabulation or set operation, and outputting the resulting data to the file in a table-formatted manner. However, MIMS is less flexible in that a user cannot freely change a command, such as the basic descriptive form of processing for translation of the table-formatted data.

Further, attention is directed to a database retrieving (operating) language for information processing analogous to a table-translating function. The database retrieving (operating) language has no capability of describing important logic relationships for information processing, such as setting of initial values (initializing) used in describing the information processing for production management, the definition of internal variables, substitution of values for internal variables, and the processing of overflow values (post-processing) produced during tabulation.

Moreover, the technique disclosed in JP-A-62-57023 utilizes a document style ordinarily used by a person in charge of production management and is designed to directly receive an output specification (output table specification)

for information processing required by the user and to configure the information procedure based on the output specification. This technique allows the user to indicate his or her desired output specification in a table-format padding manner, which makes it possible to avoid the necessity of selecting and indicating the input data and the information procedure. This technique is advantageous in receiving as an output specification the requirement about item arrangement of an output table, item attributes, and operational conditions and defining the processing specification (executable processing) based on the received requirement.

This technique, however, does not provide means for determining whether or not the procedure defined by the system itself is acceptable to a user. Hence, in case the user desires to change a production schedule based on his or her specific criterion, for example, to change a production schedule into the most economical schedule, the user cannot change the schedule, because, as stated above, this technique does not provide means for partially changing the procedure defined by the system itself. This is a disadvantageous point of this technique.

SUMMARY OF THE INVENTION

It is an object of the present invention to provide an information processing method and device which is capable of constituting detailed procedure based on the specification for the information processing required by a user.

It is another object of the present invention to provide an information processing method and device which is capable of reflecting a user's trial and error operations on the resulting procedure.

BRIEF DESCRIPTION OF THE DRAWINGS

FIG. 6 is an explanatory table for illustrating an operating procedure of the information processing system and the expertise knowledge required for operating the information processing system;

FIG. 8 is a view showing component items of the information shown in FIG. 7;

FIG. 15 is a table showing management commands used in a command type software language ALFA/M, developed by Hitachi, Ltd., preferably adapted to description of the table-translating procedure;

FIG. 16 is a table showing basic commands used in ALFA/M;

FIGS. 17 to 35 are explanatory views for illustrating screens on which there are displayed the procedure, the processing content, and the processed result of the information processing system, and further the content of a dialogue between the present information processing system and a user;

FIG. 36 is an explanatory view for illustrating the translation procedure of attributes of items in the information processing system according to the present invention;

FIG. 37 is an explanatory view for illustrating the format in which the information-processing specification required by a user is received;

DESCRIPTION OF THE PREFERRED EMBODIMENT

Hereinafter, this description will be directed to an output specification illustrating a type of information processing system according to an embodiment of the present invention with reference to the drawings.

At first, the description will be directed to how the inventors have come to invent the output specification illustrating information processing system according to the present invention.

Assume that a person uses a specific information processing system for the purpose of information processing in connection with a certain business (for example, designing a production schedule), though, the person has poor knowledge of how the information processing system executes the information processing. The information processing system which the person can use most easily is supposed to be a system which is capable of configuring (defining) the necessary input data and the procedure, executing the procedure, and outputting the processed result only when the user (operator) requires the system of the output specification (output table of the required specification) for his or her desired information processing. This type of system makes it possible for the user to define the output specification for the information processing based on only a knowledge of the business the user is in charge of and to input the actual data into the output specification so that the user can precisely, quickly and easily perform various kinds of information processing required for carrying out the user's business.

For this purpose, the information processing system serves to break the series of procedures required by the user into basic units (basic processing blocks), that is, the input of data, the procedure, and the resulting output of data. Those processing units are stored in a storage unit together with the information about the method for assembling the basic processing units. The information processing system can thus link the processing units with one another on the basis of an origin of a specific output table related to the output specification input by the user, thereby making it possible for the information processing system to search the series of procedures required for outputting the output specification and all the input data required for the procedures. Hence, in case the user (operator) simply requires the information processing system of the output specification (the specification of the output table) for the information processing, the system is capable of defining the input data and the procedures required for operating on the output, actually executing the procedures, and outputting the resulting data. The information about the method for assembling the basic processing units will be referred to as knowledge of building the information processing procedure.

Figure 3:
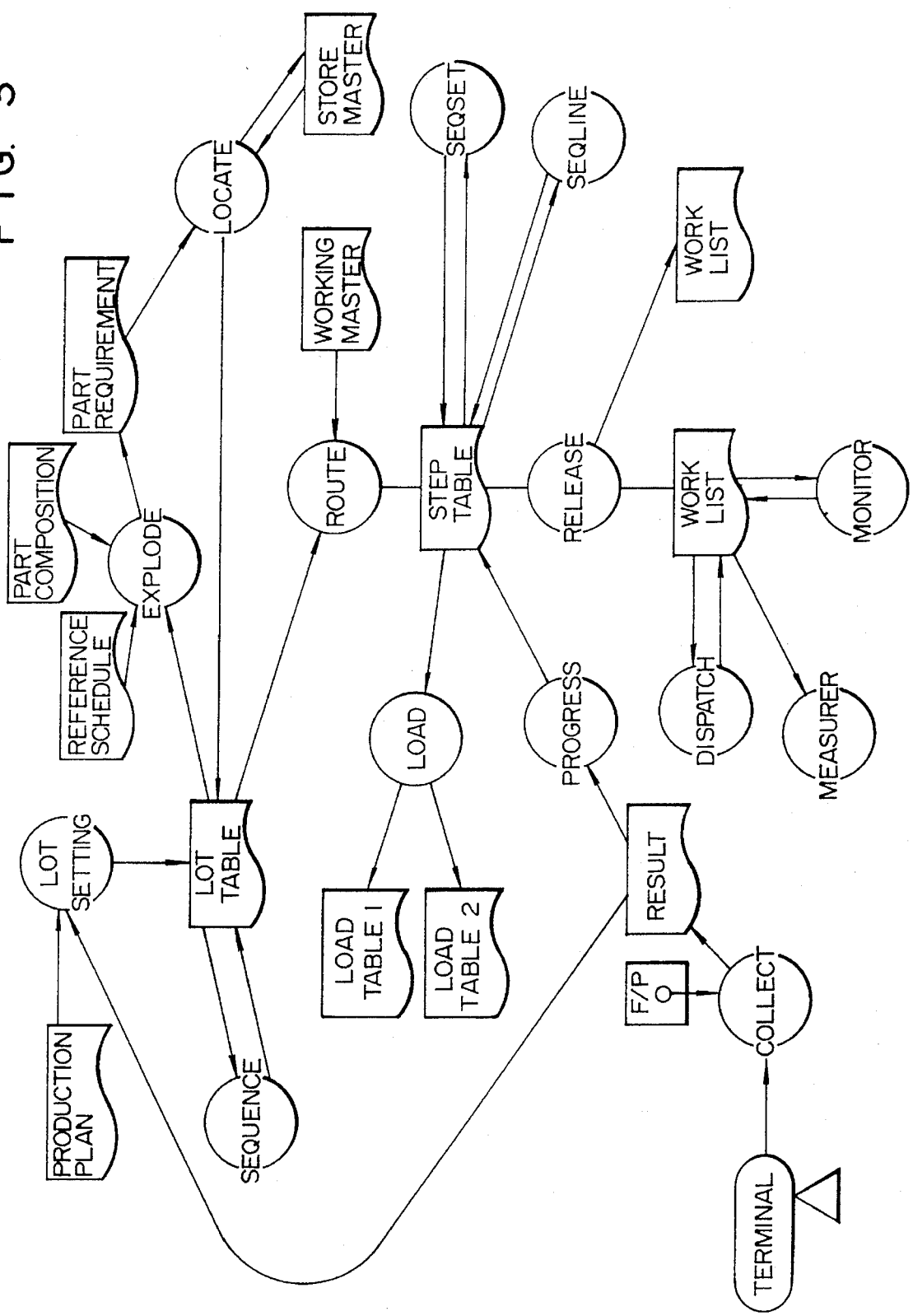
FIG. 3 is a chart showing an example of information processing process executed in the production management adapted to the output specification illustrating type information processing system according to the present invention.

FIG. 3 shows an object model to which the information processing method based on the foregoing principle should be adapted. The descriptive format of the model shown in FIG. 3 has been developed for the present invention. As shown, the model represents how several steps passed from an input to an output are connected in a tree-like connecting relation. Thus, this descriptive format is a preferable format so that the user can easily understand the overall procedure of the system when the system designer builds the information processing system and the user operates this system. As shown in FIG. 3, the information processing executed in the production managing system mainly includes table-formatted data processing, that is, reading the data (table described by an arrow-firing rectangle) in a file in a document-like table format, performing necessary calculations (procedure described by a circle corresponding to a connecting point of two or more arrows), and writing the resulting data in the table-formatted file (table described by an arrow-indicating rectangle).

In the conventional production managing system, such data processing has been program-packaged as a formulized procedure for each output table. To use (operate) the conventional program for the data processing, it is necessary to take the following steps as shown in FIG. 6.

(1) The user of the system (program) recognizes the subject of the information processing (for example, designing a production schedule).

(2) The user determines the content of the information processing required for realizing the subject and the output specification of the resulting data.

(3) The user selects a proper program based on the content of the information processing and the output specification.

(4) The user grasps the content of the selected program and prepares the necessary data.

(5) The user defines parameters for controlling the flow (procedure) of data processing (for example, control data for specifying whether or not the processing gives priority to the date of completion of the work or the working rate of the equipment in case of designing a production schedule).

(6) The user executes the information processing based on the defined flow of data processing.

(7) The user interprets the output table supplied as an information processing result and makes sure of whether or not the output has a desired specification.

(8) In case the output does not have a desired specification, the user re-starts the procedure to operate the information processing system and repeats it until the user obtains the output with a desired specification.

As stated above, the conventional information processing system requires the user to have knowledge of the operation of the system, for example, the definition of the processing content, the selection of a proper program, preparation (creation and editing) of input data, and the definition of the required procedures in addition to the knowledge of the user's business. In particular, the required knowledge concerns computer hardware, the operating method of the computer, the software language, and a programming technique using the software language, the structure of the database, the operating language and the method of accessing the database, and so forth. Hence, the operator of the information processing system is required to become familiar with the operation of the information processing system by reading manuals about the system or by attending a lecture from a system designer or a dealer.

Any information processing system, whether the system for managing production or for any kind of procedure, is provided to precisely and quickly perform the subject business. Hence, the information processing system requires the user to freely change an output specification for information processing such as the processing content and the output format, if necessary, so that the user can obtain the necessary information (output table). Further, the information processing system is also required to be designed so that the user can operate the system with his or her own business knowledge only.

As shown in FIG. 3, the information used for controlling and managing the production schedule includes a production schedule table in which a production amount and a date of completion of a product are described, a part table in which raw materials and a quantity of parts are described, a reference schedule table in which working periods for working and assembling a product or parts are described, and the like. The person in charge of the production management calculates when the production should be started for completing the product until the date of completion on the basis of that table-formatted information (referred to as table-formatted data or just a table). The calculated result is output in the same table format as the input data. The information processing procedure for production management is basically composed of inputting table-formatted data, translating the table-formatted data, and outputting the data in a table format. Herein, the data processing based on the input and output of the table-formatted data will be referred to as table translation.

According to the present invention, the information processing system is composed of the following means so that the system is allowed to be operated most easily by the user. That is, (1) The user can specify the output specification for any information processing required for performing the subject business.

(2) Each time the user changes an output specification, the system itself is capable of reconfiguring the software (procedure) according to the change of the content to be processed.

(3) When executing the configured procedure, the system itself is capable of preparing the necessary input data and storing and holding the data (middle data) used under the processing process until the resulting output can be obtained.

(4) In re-configuring the procedure and executing the processing, the system is capable of indicating the process to the user and receiving a requirement about change of the re-configured procedure from the user.

(5) In displaying the re-configuration of the procedure and the re-configuring process, with the trial-and-error process of the person (user) in charge of the subject business, the system is capable of displaying the procedures in sequence near the output specification indicated by the user. Further, when receiving a change in a specific procedure, similarly, the procedures are allowed to change in sequence near the output table.

Now, the description will be directed to a descriptive language of the preferable information processing system for table translation.

The information processing procedure for managing production basically includes a table translation (processing) involving inputting of table-formatted data, translating the data, and outputting of the resulting data in a table format. The information processing system according to the present invention represents an information processing with the following basic processing steps.

(1) The processing from an input to an output of the I/O data is assumed to be a translating process for a table. This is referred to as a table-translation process.

(2) The basic element of the table translation is an operation performed between the items contained in one table and an intra-table connection representing a connecting operation performed among two or more tables. All the procedures of the software are represented with a combination of table translations.

In case the software is represented by a combination of table translations, the input data relating to one basic table translation, the processing of the input data, and the output of data supplied as a processed result are connected in a tree-like manner as shown in FIG. 3. The tree leaf matches the input of data, the tree branch matches the procedure, the tree trunk matches the intermediate result, and the tree root matches to the output of data. The intermediate result (table under the processing process) matching the tree trunk represents the procedure performed before the table data is obtained. Thus, the tree trunk represents the output specification of the input data entered into the procedure.

Figure 4:
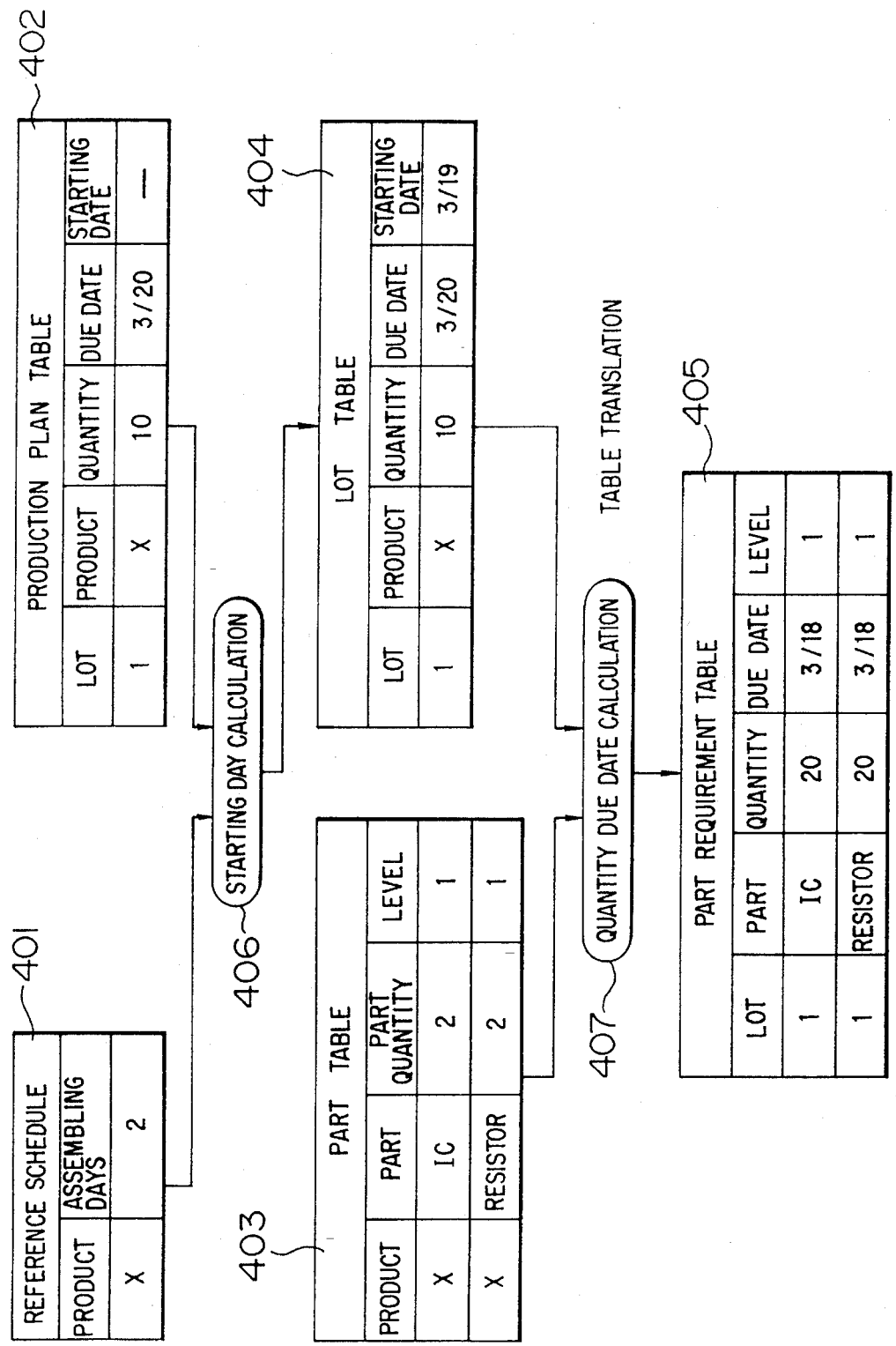
FIG. 4 is a concept view showing an input and output table for table translation adapted to the information processing system according to the present invention.

FIG. 4 shows an information processing representing part of a table translation shown in FIG. 3 for connecting an arrow directed from an upper to a lower level, an I/O table represented as a rectangle mark, and a procedure (table translation) represented as an oval mark along the sequence from an input table to an output table.

Further, FIG. 4 shows how a table is translated for creating a part requirement table 405 containing information, such as what type of part is needed, when the part manufacturing is started, and so forth, in case of creating the part required for manufacturing a product. In order to obtain a part requirement table, there are required a reference schedule table 401 representing a period required for manufacturing (assembling) a product, a production schedule table 402 representing the required quantity of the products and the required period (due date), and a part table 403 representing the kinds of all the parts and the required quantity of the products required for manufacturing one product. Those tables are translated for obtaining a lot table and a part requirement table. The lot table, representing how many of each product (product unit or lot size) are produced, can be obtained by performing a starting date calculation 406 by using a reference schedule table and a production schedule table as input data. The part requirement table can be obtained by performing a quantity and due date calculation 407 by using the lot table and the part table as input data.

Figure 5:
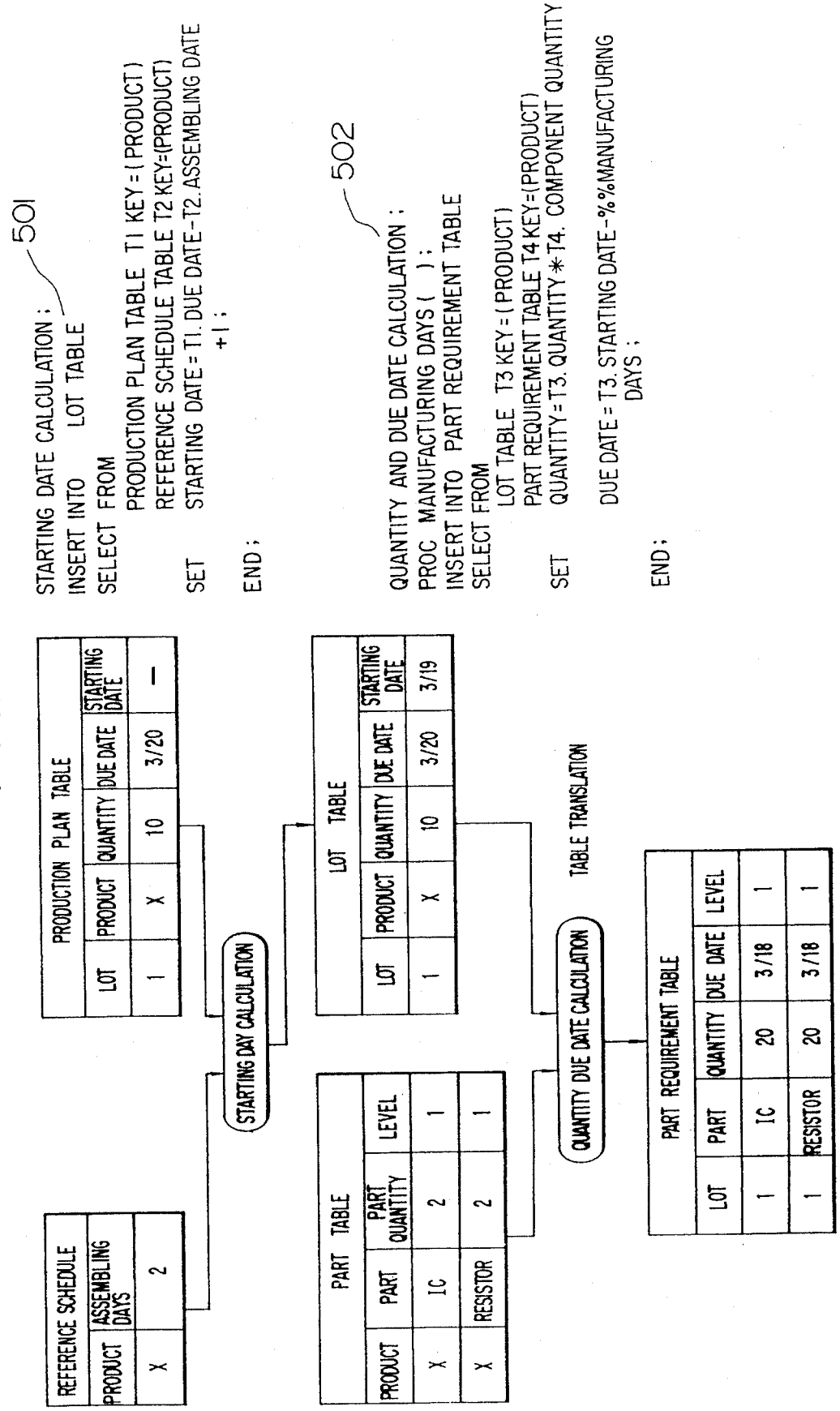
FIG. 5 is a view showing a descriptive format of a table-translating command created in the information processing system according to the present invention.

If a descriptive language ALFA/M (All-in-one Language for Factory Automation/Management) for table-translation commands developed in Hitachi, Ltd. is used, the detail of the calculation (table translation) of each table is allowed to be described in the formats of 501 and 502 shown in FIG. 5. Herein, the ALFA/M language includes a specification based on a relational type database language SQL (Structured Query Language) defined by the ISO (the International Organization for Standardization). Hence, the language ALFA/M is composed of the following two command groups which even those persons in charge of production management who are not computer experts, can easily understand. The database language SQL is described in, for example, C. J. Date, "Database Systems", Vol 1 fourth edition, pp. 281–313.

(1) Basic Command: Basic command for describing a logic of a production management software (see FIG. 15), 37 commands such as UPDATE;

(2) Management Command: Command for exploding standard functions used for the production management into parts (see FIG. 16), 34 commands such as EXPLODE;

The combination of those commands makes it possible to create the information processing procedure to be described as a table translation, such as production managements in a far fewer number of steps than the existing languages (COBOL, FORTPAN) (The former language needs only a fewer number of steps than the latter language by $1/15$).

That language is one example of a software descriptive language (table-translation descriptive language) provided for arrangement of the information processing system (table-translation system).

Next, the description will be directed to how the information processing process for production management arranged by this table-translation descriptive language is broken into basic processing units and those basic processing units are assembled and stored in a computer.

Actually, when implementing the production management in a factory, the information processing system is capable of displaying the information required by a person in charge of the production management in a table format. Hence, the information processing process performed in the production management is allowed to be represented by repeating the translation from one table-formatted data to another table-formatted data. With this function, one translation from one table-formatted data to another table-formatted data is assumed as a basic processing unit used in the information processing for the production management. How the basic processing units are represented and stored so that the basic processing units can be assembled according to the operator's requirement will be described with reference to FIGS. 1, 2, 5, 7, 8, 38, 39, 40, 41, and 42.

Figure 1:
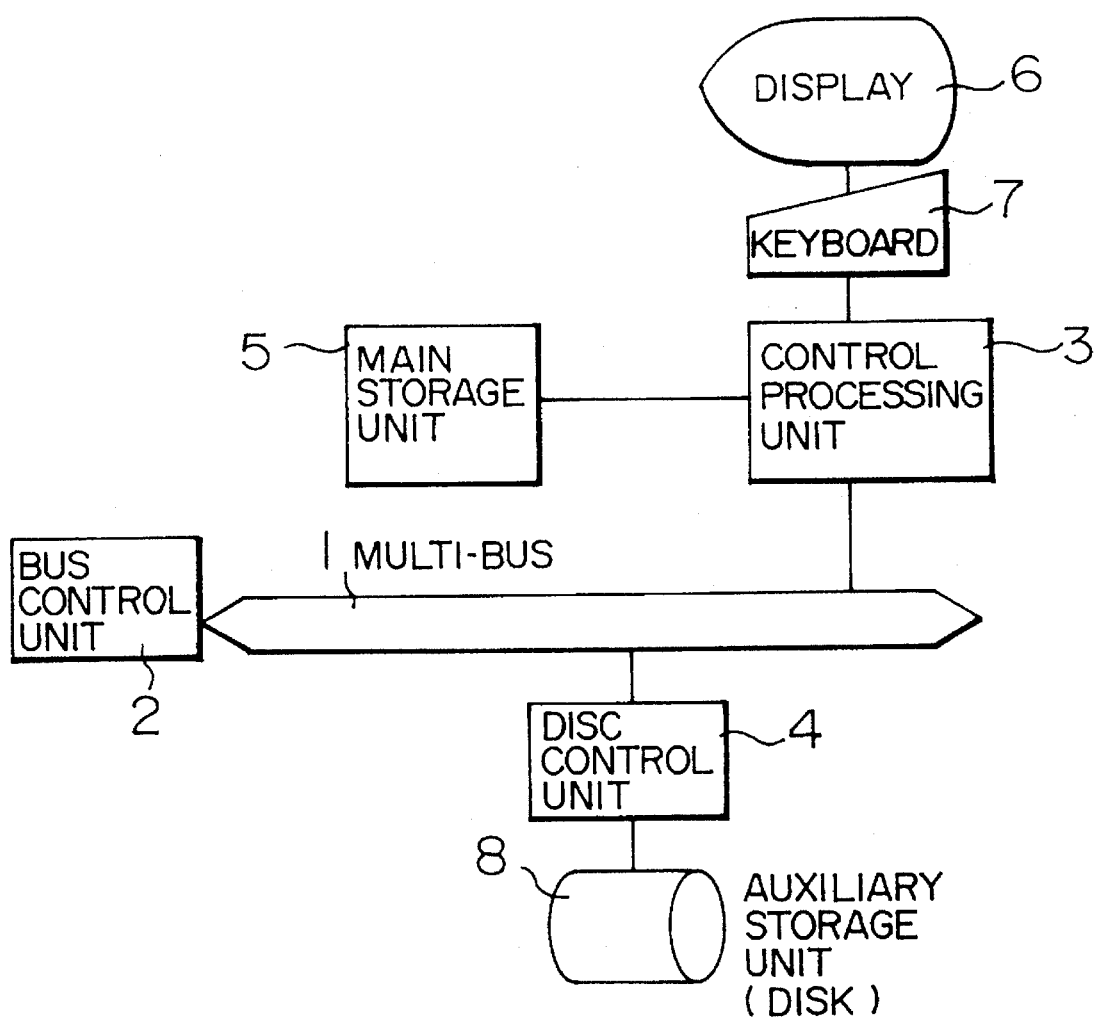
FIG. 1 is a diagram showing hardware of a computer system adapted to an output specification illustrating type information processing system according to an embodiment of the present invention.

As shown in FIG. 1, a computer used in the present information processing system includes a multibus 1, a bus control unit 2 for controlling the multibus 1, a central processing unit (CPU) 3 connected to the multi-bus 1, a disk control unit 4, and a main storage unit 5 connected to the CPU 3, a display unit 6, a keyboard 7, and a disk 8 connected to the disk control unit 4. When the data is input from the keyboard 7, the data is read into the main storage unit 5 by the CPU 3 and is displayed on the display unit 6. The data stored in the main storage unit 5 is sent to the disk control unit 4 through the multi-bus 1 by the CPU 3 and is stored on the disk 8 through the effect of the disk control unit 4.

Figure 2:
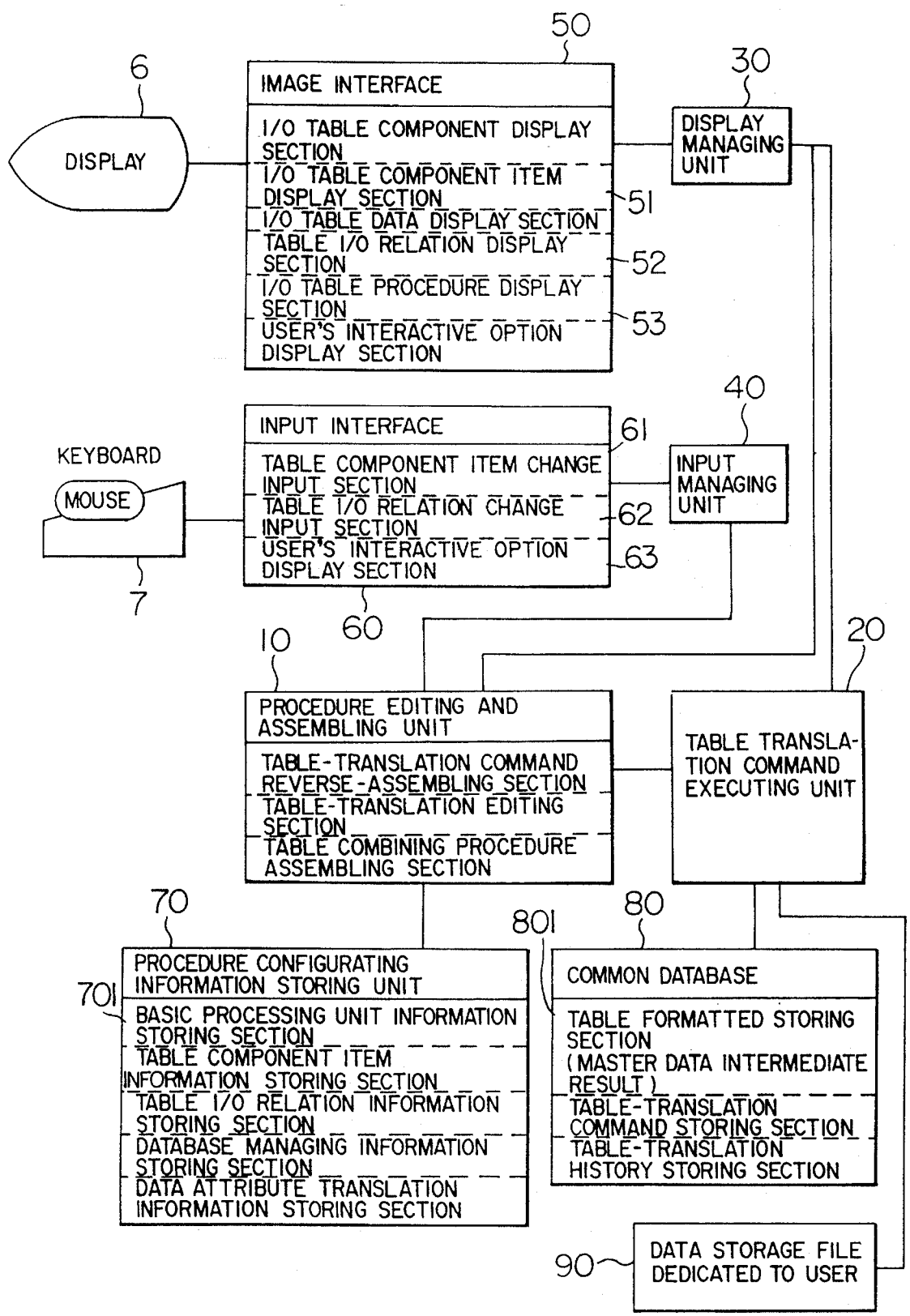
FIG. 2 is a diagram showing software configuration of the output specification illustrating type information processing system according to the embodiment of the present invention.

As shown in FIG. 2, the software configuration for implementing the present information processing system includes a keyboard or mouse 7, an input interface 60, an input managing unit 40, a display unit 6, an image interface 50, a screen display managing unit 30, a procedure editing and assembling unit 10, a table-translation command executing unit 20, a procedure configuring information storing unit 70, a common database 80, and a user-dedicated data storing file 90. The image interface 50 is composed of an item display section 51 for an I/O table, an I/O relation display section 52 for the I/O table, and a procedure display unit 53 for the I/O table.

The input interface 60 is composed of an item change input section 61 for a table, an I/O relation change input section 62 for a table, and a to-be-processed content change input section 63 for an I/O table.

The user inputs his or her desired specification for information processing from the keyboard or mouse 7. The input interface 60 serves to manage the data for the required specification input from the keyboard or mouse 7 and to transfer the data to an input managing unit 40. The input managing unit 40 transfers the data to the procedure editing and assembling unit 10. The procedure editing and assembling unit 10 serves to edit and assemble the procedure required for processing the required specification input by the user. Then, the procedure editing and assembling unit 10 transfers the edited and assembled procedure to the table-translation command executing unit 20 and the screen display managing unit 30. The table-translation command executing unit 20 serves to execute the procedure (table-translation command) transferred from the procedure editing and assembling unit 10 and transfer the processed data for display.

The screen display managing unit 30 transfers the processed data transferred from the procedure editing and assembling unit 10 and the table-translation command executing unit 20 to the image interface 50. The image interface 50 serves to display the processed data and the processing process of the data transferred from the procedure editing and assembling unit 10 and the table-translation command executing unit 20. The procedure configuring information storing unit 70 stores the information (procedure configuring information) used in editing and assembling the procedure of the required specification received by the user. The common database 80 stores the table-translation command edited and assembled in the procedure editing and assembling unit 10, the input data required in executing the table-translation command, the output data composed of the processed result, the processing process of the data (history of table translation), and the table-translation command used in editing and assembling the procedure. More particularly, the procedure editing and assembling unit 10 serves to convert the table-translation process (procedure) required for the desired output into a table-translation command column according to the descriptive format shown in FIG. 5, based on the output specification received from the user and to store the table-translation command column on the disk 80.

Figure 7:
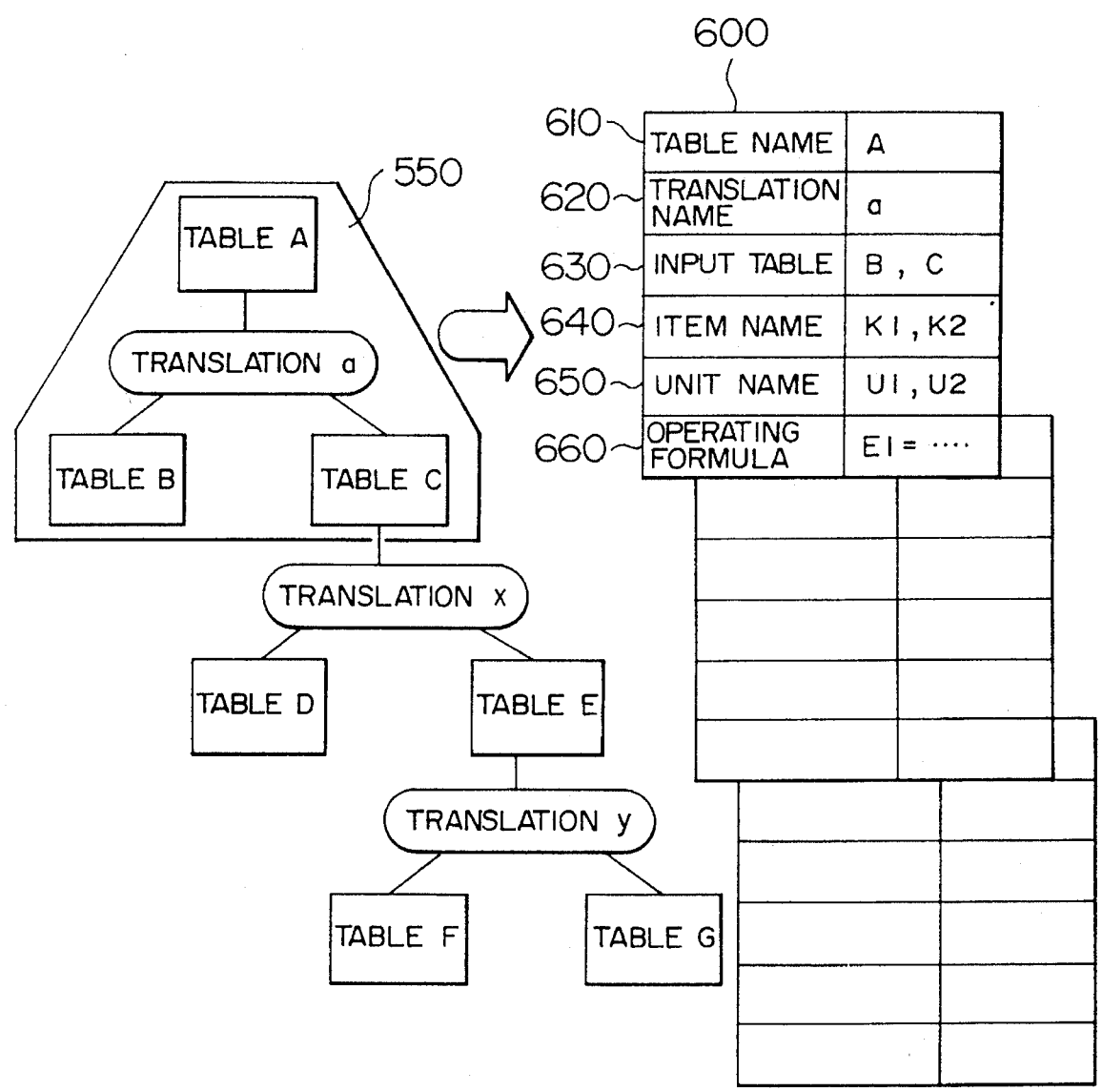
FIG. 7 is an explanatory view for illustrating a descriptive format of the information about the method of breaking the information processing process executed in the production management into basic processing units and assembling those units into the original process when it is required.

As shown in FIG. 7, 550 denotes a basic processing unit for the information processing executed in the information processing system for executing the production management composed of repeated translation from one kind of table-formatted data to another kind of table-formatted data (referred to as a table). 600 denotes data to be stored together with the basic processing unit and the assembling method in an external storage unit of a computer. The processing unit information includes a name of a table 610 resulting from one translation, a name of a procedure 620 for the translation, a name of an input table 630 to be used for the translation, names of items 640 composing the table, and an operation formula 650 for calculating each item. The processing unit information is stored in a basic unit information storing section 701 contained in the procedure configurating information storing section 70. The processing unit information including those elements stored in the information storing unit 70 will be referred to as knowledge. The set of knowledge will be referred to as a knowledge base. In case no translation is capable of creating a required table, that table is pre-stored in a table-formatted data storing section 801 of the common database 80 included in the information processing system as an input basic knowledge (processing unit information) (for example, 901, 902 and 904 shown in FIG. 9). The input basic knowledge leaves the knowledge translation name 620, the input table 630, and the operation formula 660 shown in FIG. 8 empty.

The more concrete representation of the knowledge will be described by taking an example of an actual production managing system. In FIG. 9, 901 to 905 denote knowledge about a production schedule table, a reference schedule table, a lot table, a part table, and a part requirement table used in the table translation described in FIG. 5.

Next, with reference to the information about the output required by the operator, the input data needed for obtaining the required output and the processing procedure of the required data will be described in more detail with reference to FIGS. 2, 9, 37, 38, 39, 40, 41, and 42.

Figure 9:
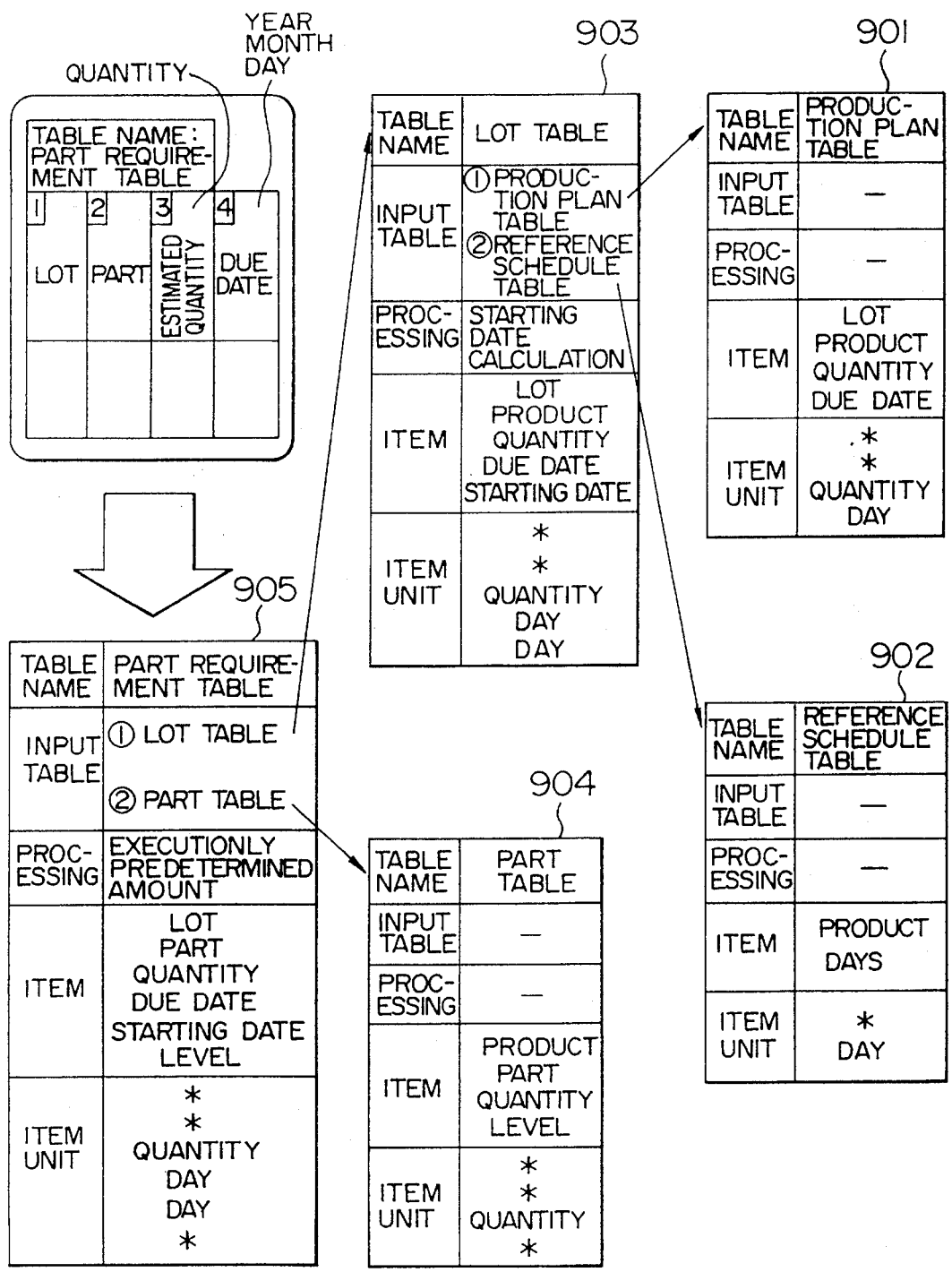
FIG. 9 is an explanatory view showing principle on which the necessary information processing procedure is built by using the information shown in FIG. 7.
Figure 10:
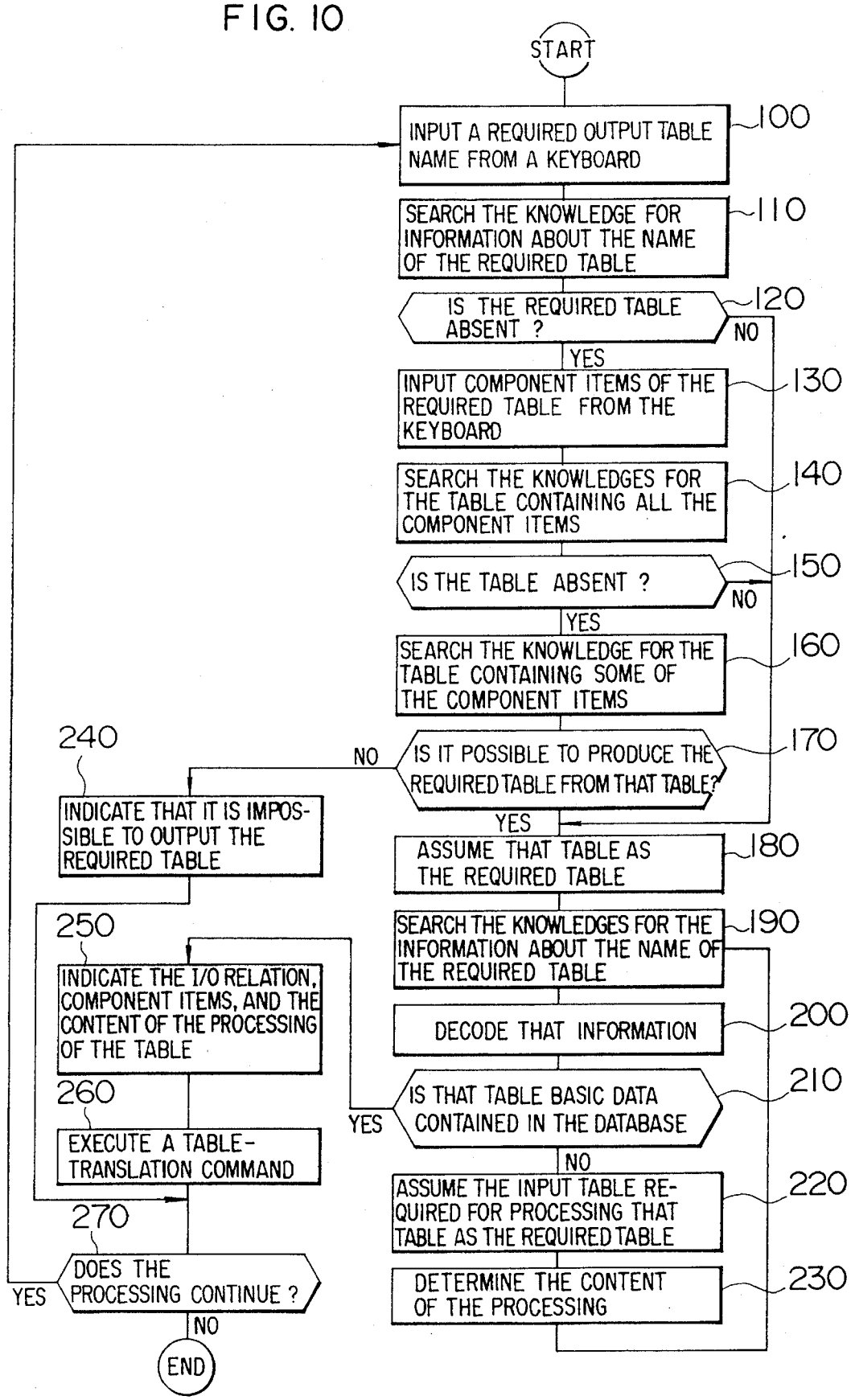
FIGS. 10, 11 and 12 are flowcharts illustrating the process for creating the information processing procedure for the production management on the basis of the table translation.
Figure 11:
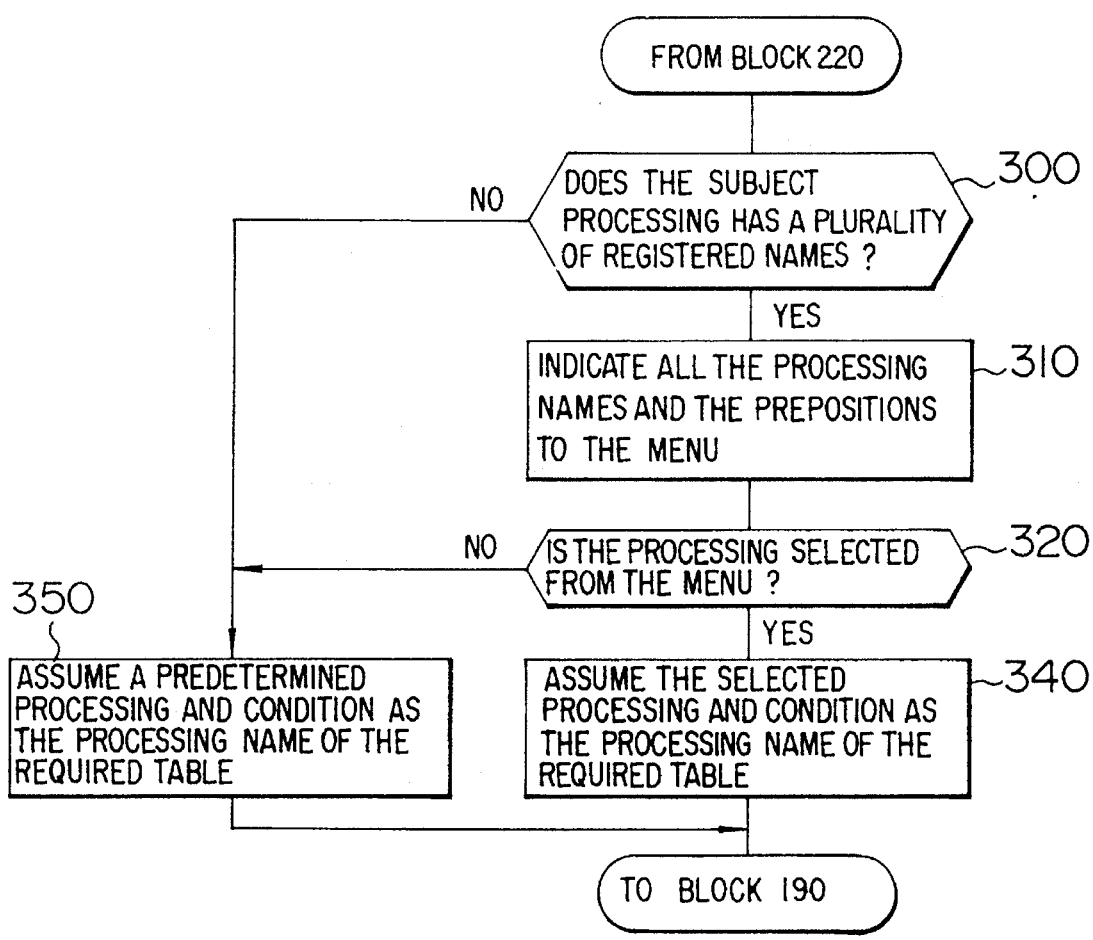
Figure 12:
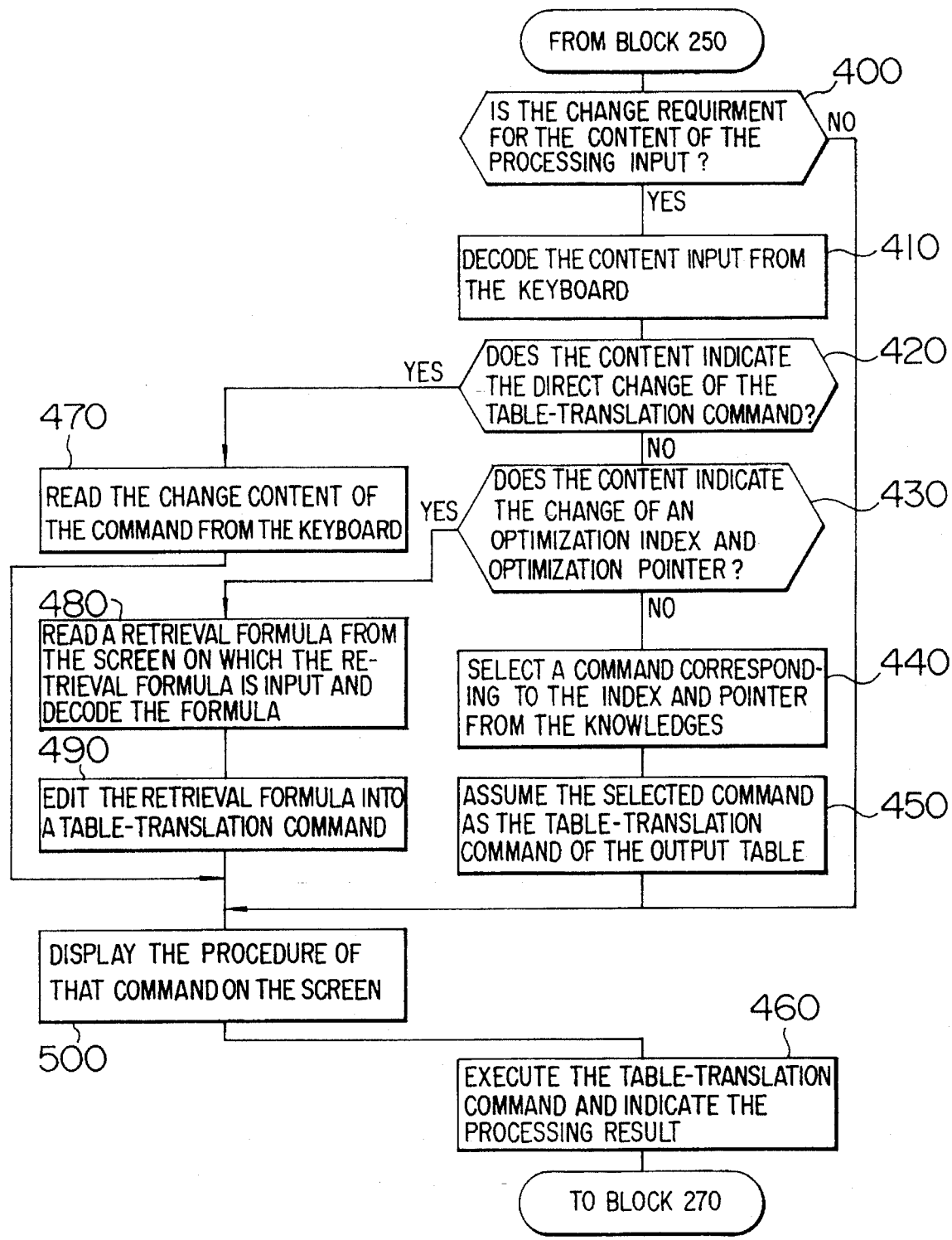

In FIG. 9, assume that the operator of the information processing system inputs a requirement for obtaining an output of a part requirement table. This requirement is inputted through the input interface 60 with the keyboard or mouse 7. The basic processing unit storing section 701 (table-translation knowledge base) included in the procedure configurating information storing unit 70 stores table-translation knowledge about the part requirement table 901, the lot table 902, the part table 903, the production schedule table 904, and the reference schedule table 905.

When the operator requires the part requirement table, the present information processing system searches the knowledge base 701 for the knowledge 905 concerning the part requirement table and decodes the content of the knowledge 905. The decoded result indicates that the part requirement table can be obtained by translating the input lot table and the input part table by a predetermined amount. Then, the present system operates to search the knowledge base 701 for the information 903 and 904 concerning the lot table and to the part table and decode the contents of the information 903 and 904. The knowledge about the part table does not provide information concerning the "input table" and the "translation name". It indicates that this table belongs to the master data stored in the common database. The knowledge about the lot table indicates that the lot table can be obtained by performing a table translation for calculating a starting date in the production schedule table and the reference schedule table. Further, the present system operates to search the information 901 and 902 concerning the production schedule table and the reference schedule table and to decode the information 901 and 902. The decoded results indicate that the production schedule table and the reference schedule table belong to the master data stored in the common database.

As described above, by performing the translation for calculating a starting date in the production schedule table and the reference schedule table for obtaining the lot table and performing the table translation of the lot table and the part table by a predetermined amount, it is possible to obtain the part requirement table required by the operator indicating that the item column contains "lot", "part", "quantity", "schedule", "starting date", and "level" and the item unit column contains "no unit name", "no unit name", "quantity", "date", "date", and "no unit name" as shown in FIG. 9.

With the required table name being used as a clue, the present information processing system serves to iteratively perform the process of searching for the required table from the knowledge base, finding the subject knowledge, decoding the content of the table, and storing the decoded result. When the system finds the table described as master data stored in the common database (i.e., basic knowledge; that is, the table leaves "input table", "translation name" and "operation formula" empty), the system stops the operation. Then, the translations having appeared in the master data are carried out in reverse sequence to the searching one, resulting in the ability to create the input data needed for providing the output required by the operator and the processing process of the input data.

Next, the description will be directed to means for receiving the requirement given by the operator and responding to the requirement with reference to FIGS. 10 to 37.

At first, the present information processing system of FIG. 1 requests from an operator of his or her desired output table by a message on the CRT display 6 (step 100). If the table name is provided as knowledge in the knowledge base (step 120), the system defines the input data required for obtaining the table and the processing procedure of the input data (steps 180 to 260). If the desired table is not available as knowledge, the system will request that the operator input the names of items configuring his or her desired table (step 130). Then, the system serves to determine whether or not the knowledge base stores the knowledge about the table containing the item names inputted by the operator (steps 140 to 150). If yes, the system defines the input data required for obtaining the requested output and the processing routine of the input data (steps 180 to 260). If not, the system attempts to combine some items selected from the knowledge base about the prepared table (step 170) for providing the requested table. If the system is capable of providing the requested table, the system defines the input data required for obtaining the requested output and the processing procedure of the input data (steps 180 to 260). If the system is uncapable of providing the requested table by combining the selected items, the system gives the operator an indication that the requested information cannot be output (step 240).

As described above, the information processing procedure creating device according to the invention is capable of automatically defining the input data required for obtaining the requested output and the processing procedure of the input data, when the operator just requests the system itself for information about the requested output.

Figure 13:
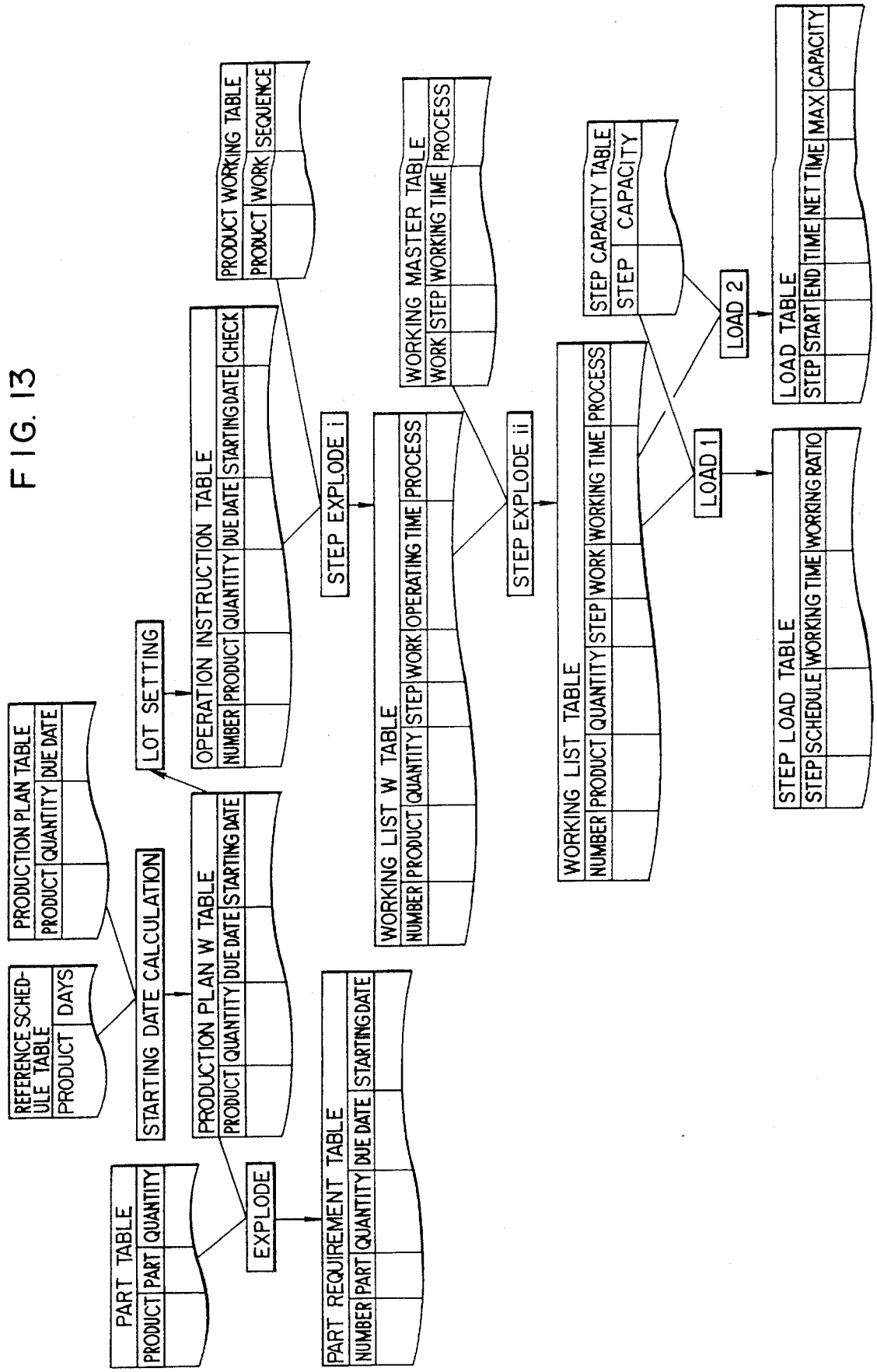
FIG. 13 is an explanatory view for illustrating the designing process of an alternative idea of the information processing.
Figure 14:
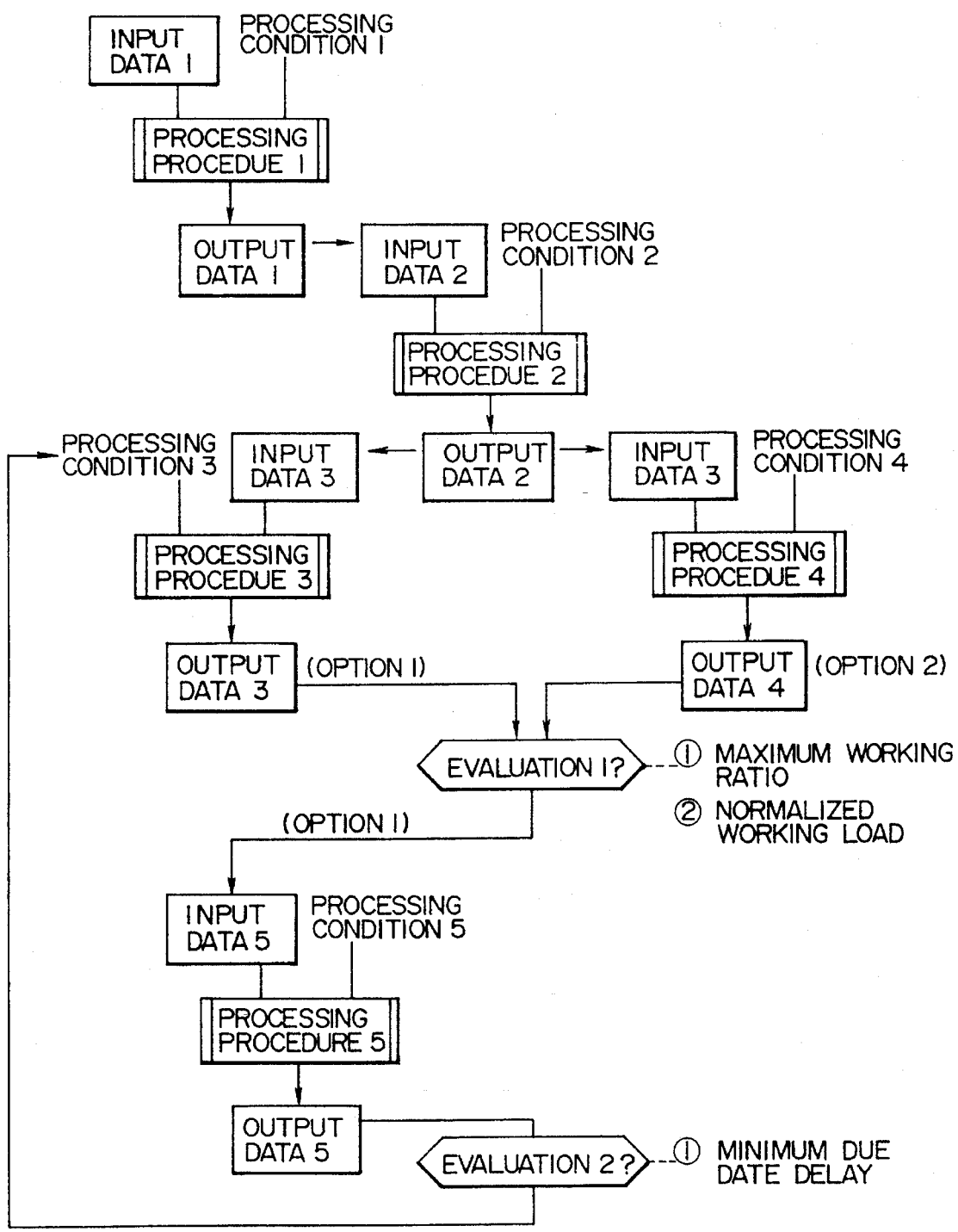
FIG. 14 is an explanatory view for illustrating the trial-and-error process performed in the designing process of the alternative idea of the information processing.

In the information processing for production management, as shown in FIG. 13, the processing of the input data composed of the same combination, for example, the combination of a work list table 131 and a step capability table 132 often results in providing different output tables (a step load table 133 and a load stack table 134). As shown in FIG. 4, this occurs in case of creating some ideas based on economical evaluation criteria in the production management. The economical evaluation criteria include a maximum work ratio, a leveled work load, and a minimum due date delay selected when creating the production schedule. Then, the description will be directed to how to realize the defining process for the translation. When creating some options based on respective evaluation criteria, each option has the corresponding content of the table translation (name of table translation) based on each evaluation criterion. Hence, two or more translation names corresponding to the contents of table translations are described in the column of the table-translation name about the knowledge of the table translation capable of providing some different options based on the respective evaluation criteria. And, as shown in the flowchart shown in FIG. 11, assuming that the user requests that the system provide on output table resulting from a kind of table translation, if two or more translation names are described in the knowledge base about the table translation (step 300), the system displays all the names of the table translations and the prepositions for the table translations in a menu-guidance manner (step 310) so as to prompt the user to select a proper one of those choices (step 320). In case just one translation name is described, no translation name is described, or nothing is selected from the menu, the present system selects the table translation of the predetermined table-translation knowledge (step 350). In case just one translation name is described or nothing is selected from the menu, the system may be designed to select the head one of the translation names.

In information processing for production management, the user has to often change the content of the translation defined by the system or selected by the user. For example, the occasion takes place wherein it is necessary to change an optimization pointer about the economical evaluation criterion. Concretely, the occasion takes place wherein the user has to determine whether the working ratio should be maximum or minimal in creating the foregoing production schedule. The optimization pointer is required to be changed because the maximum working ratio enhances an efficiency of equipment in light of time but, in general, is likely to disadvantageously increase the work in process in a production shop, and the minimum working ratio enhances production speed but is likely to advantageously lower the efficiency of the equipment in light of time. The method for realizing the defining procedure for the table translation in such a case will be described with reference to the flowchart shown in FIG. 12. At first, the system serves to indicate whether or not the requirement for changing the optimization pointer is issued (step 400). If not, the system executes the displayed table-translation procedure (command) (steps 500 to 460) and displays the processed result on an I/O table display unit (step 503).

If the optimization pointer is required to be changed, the system serves to decode the content of the requirement inputted from the keyboard (step 410) for determining whether or not the requirement is for directly changing the table-translation command (step 420). If the requirement is for directly changing the table-translation command, the system reads the changing content from the keyboard (step 470). At a time, the system displays the content, executes the processing of the translation command, and displays the processed result (steps 500 to 460).

If the requirement is not for directly changing the table-translation command, the system serves to display the optimization index and options as to whether or not the optimization pointer is to be changed (step 430). If the index optimization is to be changed, the intra-table I/O relation change input section (step 602) serves to read a retrieval formula, edit the retrieval formula into a table-translation command (steps 480 to 490), display the edited content, execute the processing of the table-translation command, and display the processed result (steps 500 to 460).

If the index optimization is to be changed, the system serves to select the table-translation command corresponding to the index and the pointer from the table-translation command storing section of the common database with reference to the knowledge about the table translation and with an aid of the table-translation name (step 440) and uses the selected command for obtaining the required output table (step 450). Then, the system serves to display the content, execute the processing of the table-translation command, and display the processed result (steps 500 to 460).

As described above, the information processing system in which the output specification illustrating a type information processing system according to the invention is employed so as to make it possible to indicate the specification (output specification) about the component items constituting the I/O table to the user. The system is capable of assembling the table-translation command based on the output specification and change or modify the assembled command in an interactive manner with the user who is unfamiliar with how the system processes the information. At a time, the system serves to read the master data included in the common database, execute the table translation of the master data, and display the result on the CRT through the image interface.

Now, the description will be directed to means for editing and assembling the table translation functions and displaying the content of the table translation and the table-translated result with reference to FIGS. 17 to 36.

The system operates to display a screen such as shown in FIG. 17 on the CRT so that the system is allowed to receive the output specification required by the user in an interactive manner. The display area 171 denotes a requirement about the output specification inputted by the user, that is, displays on the screen the items constituting the output table being inputted. An example of the screen is shown in FIG. 37. The system reads the names of the output tables concerning the table translations accumulated in the knowledge base and displays those names on the screen 172 so that the user can select a proper name with the mouse. This screen may be scrollable. If the user desires a name not shown among the predetermined names, the user selects the option 174 with the mouse, inputs the name in the table name column 171, and displays the input name in addition to the options displayed on the screen 172.

FIG. 18 shows an editing and assembling screen 181 for displaying the items constituting the table concerning a series of table translations and the contents of the table translations performed for searching the knowledge base with the aid of a table name input on the screen 171 and obtaining the output table according to the foregoing procedure. The items displayed on the screen 181 include item names such as "table name 181", "part name 182", and "estimated quantity 183" and item units such as "quantity 184". To change those items, the system operates to display information on the screen so that the user can select an option 186 about addition in the item and unit column when changing those items with the mouse and to change and modify the item. When changing the items, as shown in the screens 191 and 201 shown in FIGS. 19 and 20, the system serves to search all the item names and the unit items concerning table translations accumulated in the knowledge base and to display them as options. If the user does not find his or her desired item or unit in the options, the user should select the option 192 or 202 and input the desired item name or unit name. The system serves to display on the screen and accumulate the input item name or unit name in addition to the existing options 191 or 201.

Figure 21:
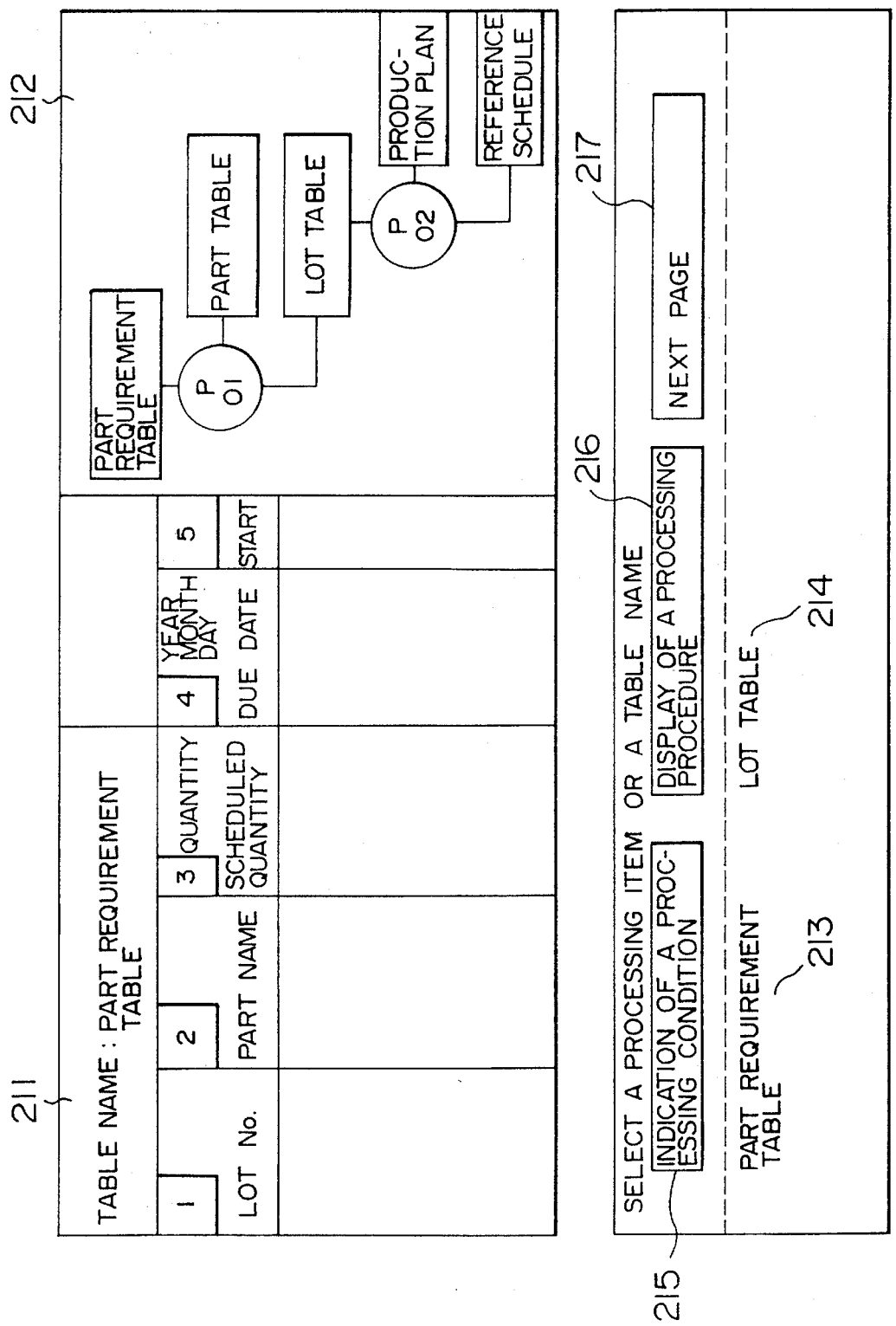

As shown in FIG. 21, the system serves to display the component item 211 about the outer specification edited and assembled in accordance with the foregoing procedure, the names 213, 214 of the required input table, and the table-translation procedure 212 so that the user can clearly grasp them. In order to display the table-translation procedure 212, the system serves to display the final output table concerning the output specification assumed as a starting point and the input tables (indicated by a rectangle) and the table translations (indicated by a circle) so that the user can clearly grasp the translation procedure. Further, the system also serves to display on the screen the table (part table shown in FIG. 21) stored in the common database and the intermediate tables (such as a lot table) in respective colors so that the user can clearly grasp the structure of the common database.

Figure 22:
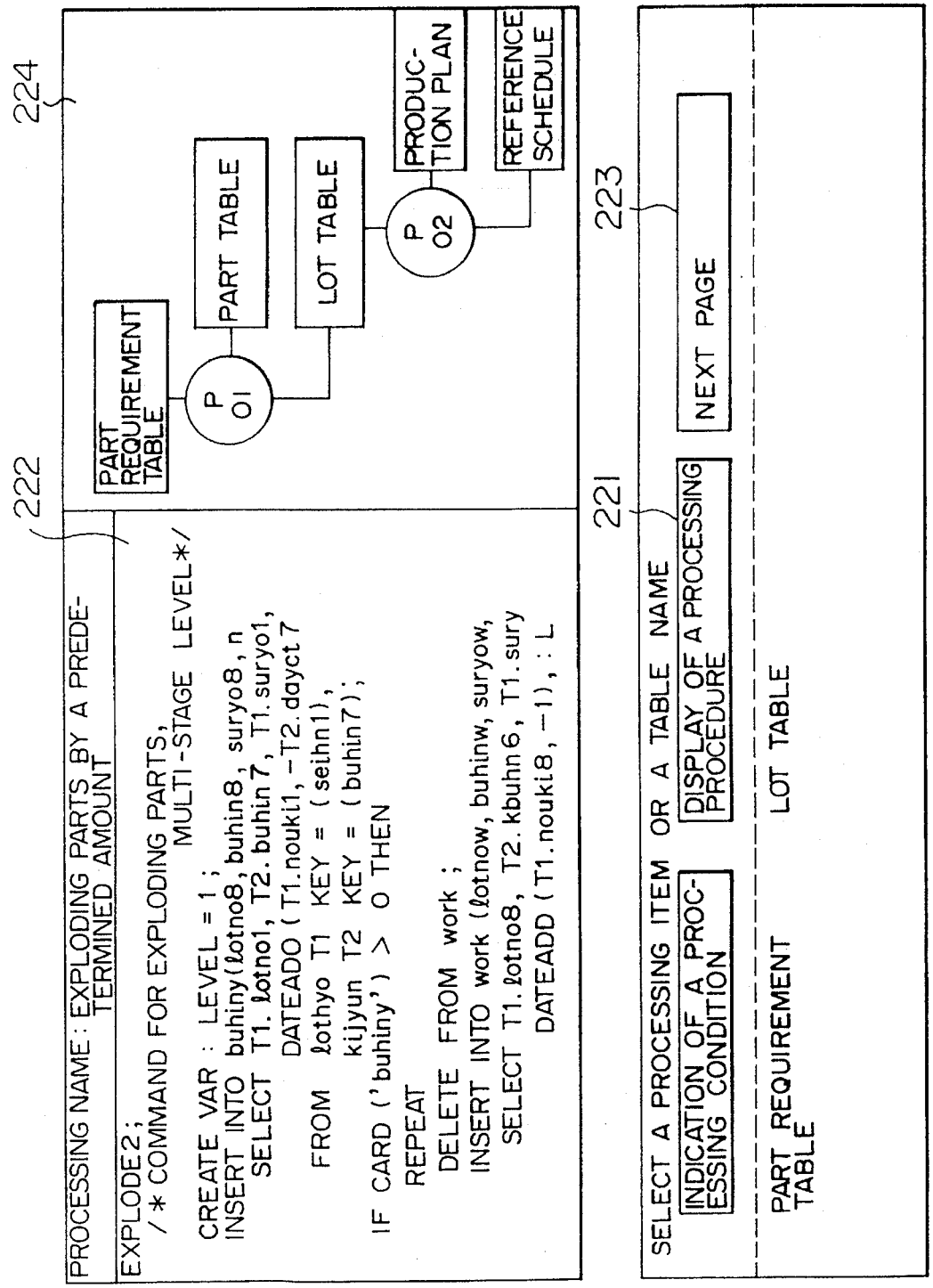

Moreover, in addition to the above tables, the system serves to display on the screen an option 216 for displaying the detail of the content (table-translation command) of each table translation and an option 215 for inputting the detail of the table-translation condition. As shown in FIG. 22, by selecting an option 221 with the mouse, the system serves to display the detail of the table-translation command (222) matching-to the table-translation name (224) indicated by a circle (P01 in this figure) so that the user can make sure of whether or not the table translation required by the user is performed properly.

Figure 23:
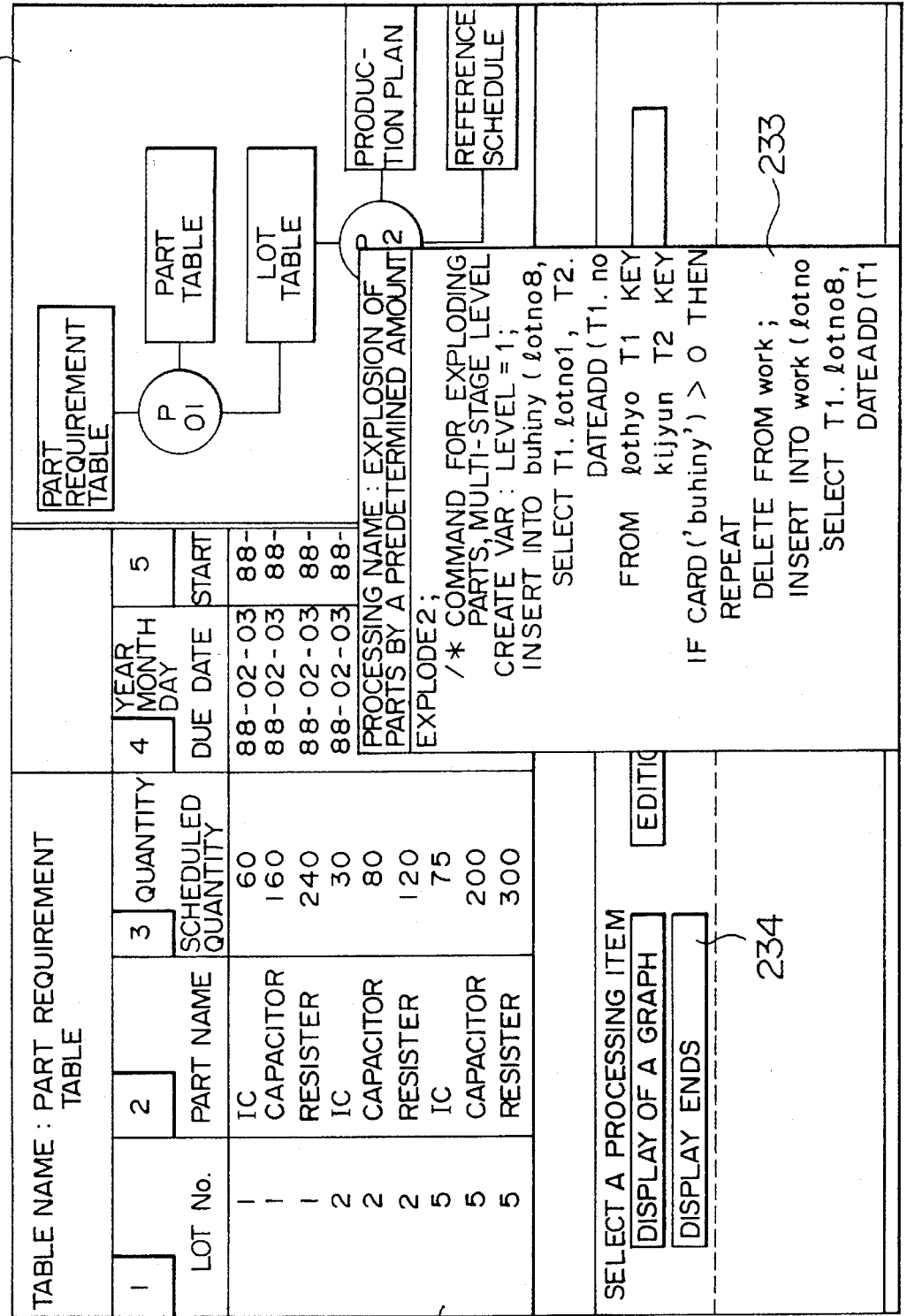

As shown in FIG. 23, with the option 223 shown in FIG. 22 being selected by the mouse, the system serves to perform the processing of the table-translation command, such as 233, in the sequence from the upper right to the lower left as displayed in 232 and display the result (231) so that the user can grasp how the required table translation is carried out and the table resulting therefrom.

Figure 24:
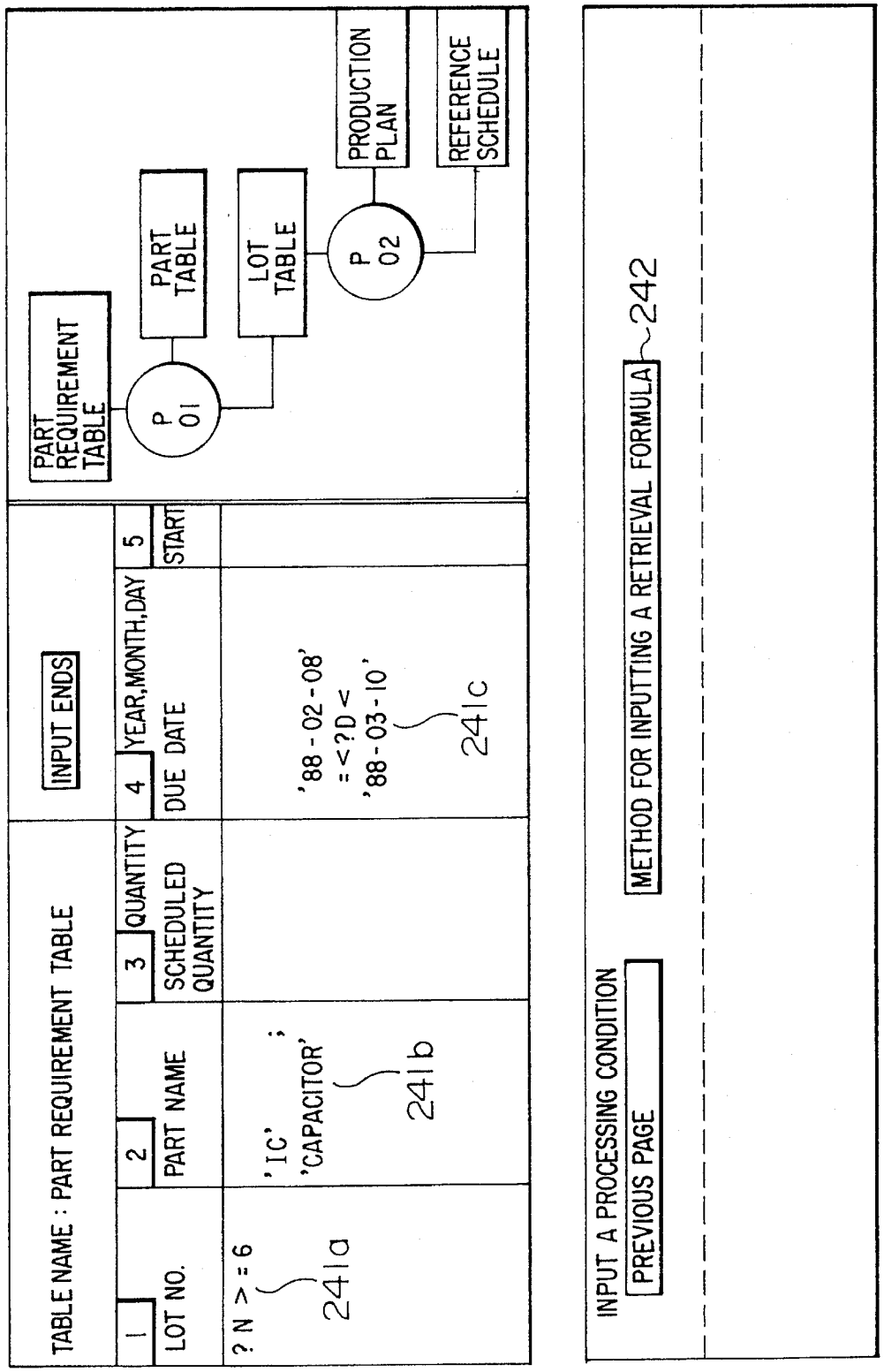

As shown in FIG. 24, with the option 215 shown in FIG. 21 being selected by the mouse, the system serves to display an interactive screen so that the user can indicate the processing of the table-translation command, such as 233, in more detail.

Figure 25:
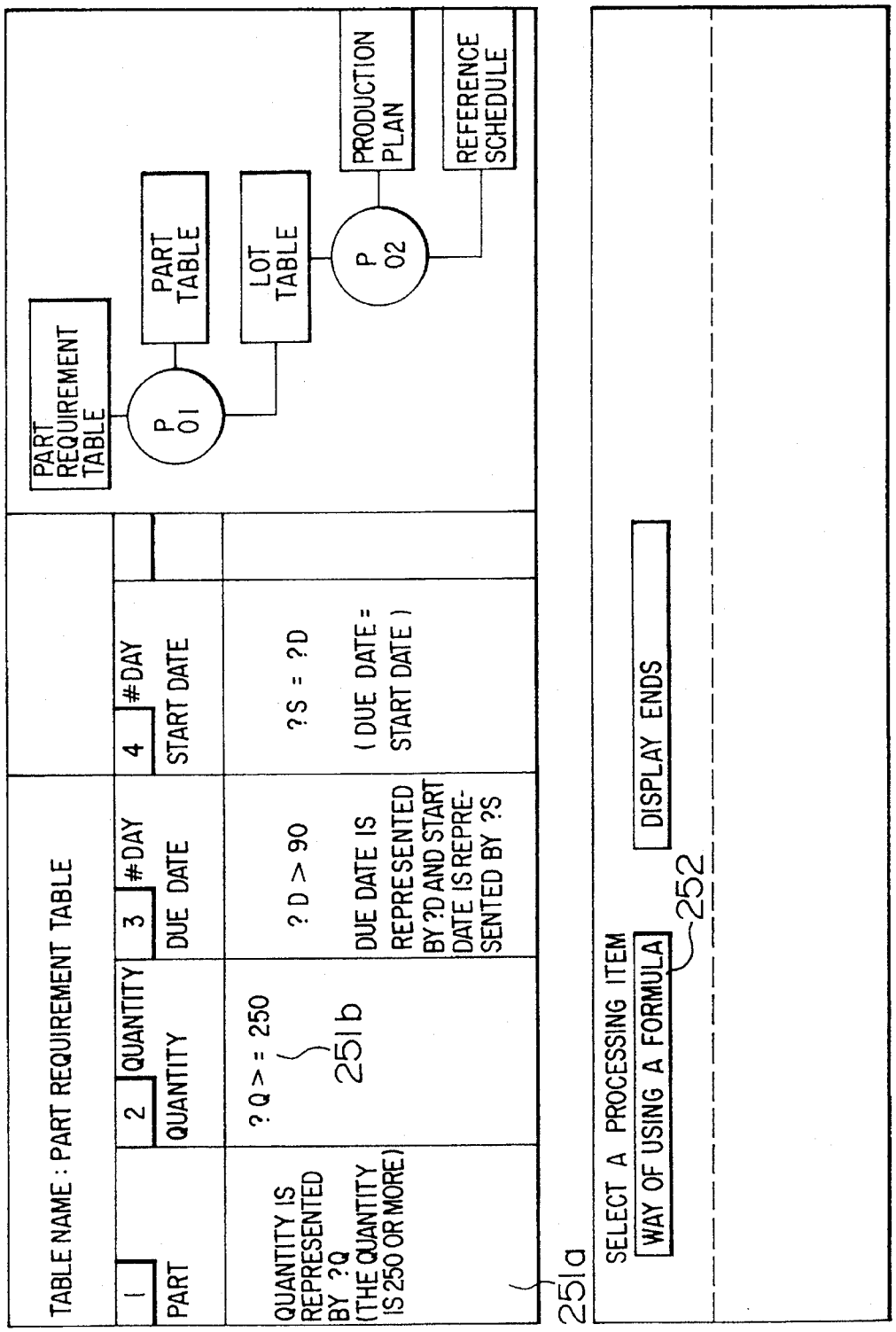
Figure 26:
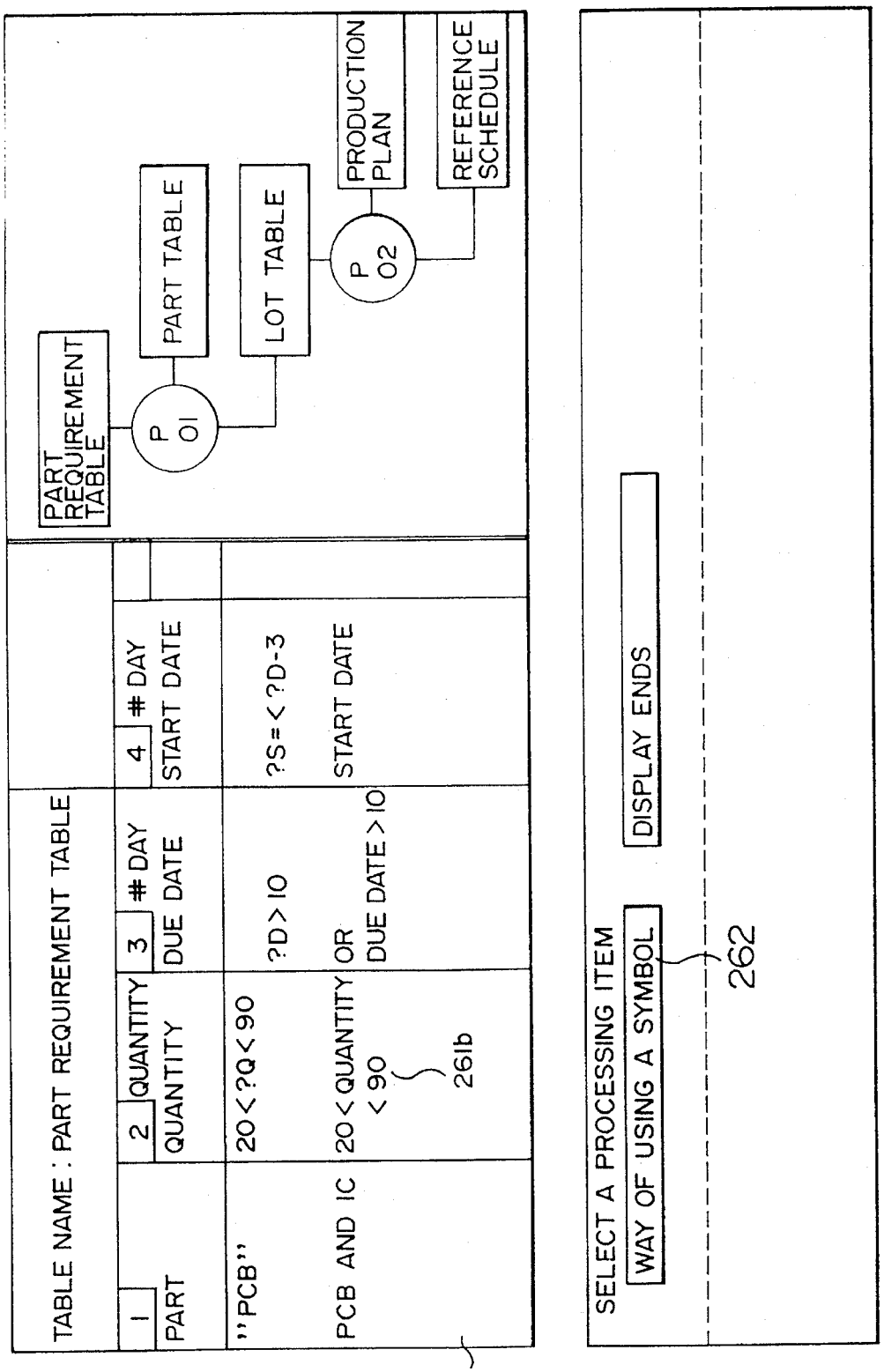

In this illustration, when calculating the part requirement table, the system makes it possible for the user to indicate "6 or more" about the lot number, "IC" or "capacitor" about the part name, "From Feb. 8, 1988 to Mar. 10, 1988" about the due date so that the user can easily and precisely change and modify the table-translation command edited and assembled by the system. As shown in FIGS. 25 and 26, the system serves to display the formulas (251a, 251b) and how to use the symbols (261a, 261b) about the indicating method for easily and precisely changing and modifying the table-translation command edited and assembled by the system itself so that the user can precisely change and modify the table-translation command. Further, the system serves to display the changed and modified result and the command-executed result so that the user can make sure of whether or not the table translation required by the user is carried out precisely.

Figure 28:
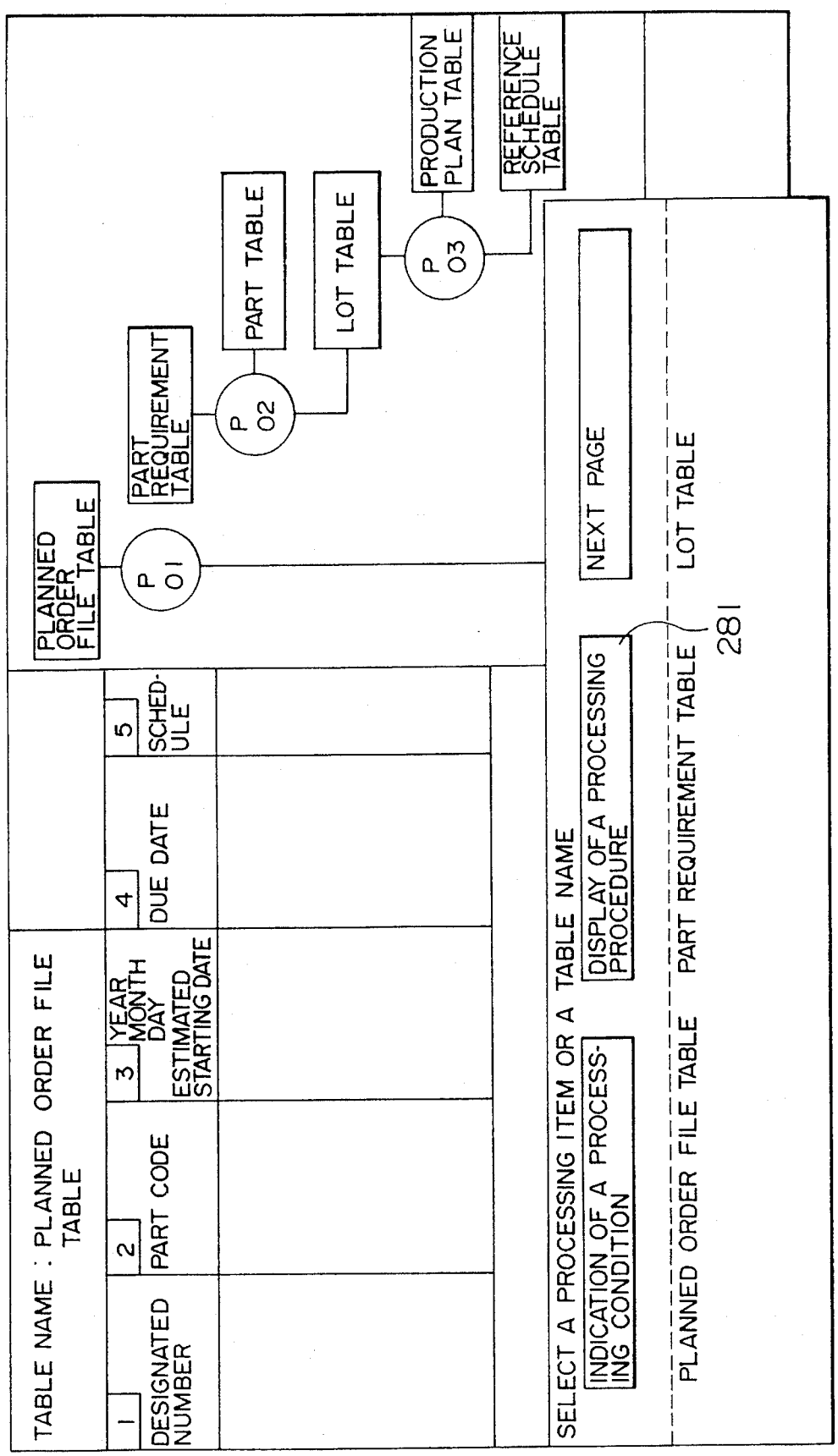
Figure 29:
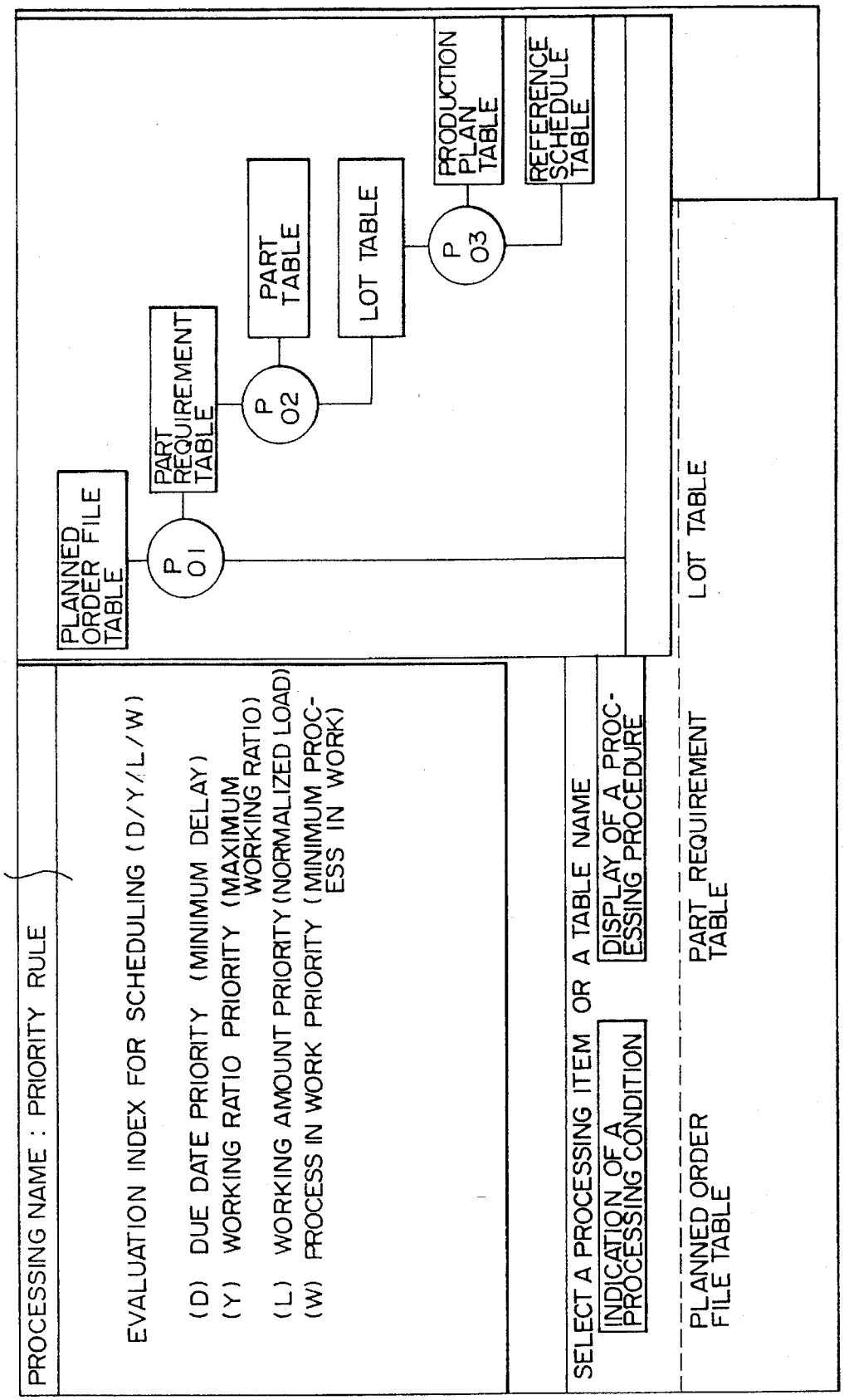
Figure 30:
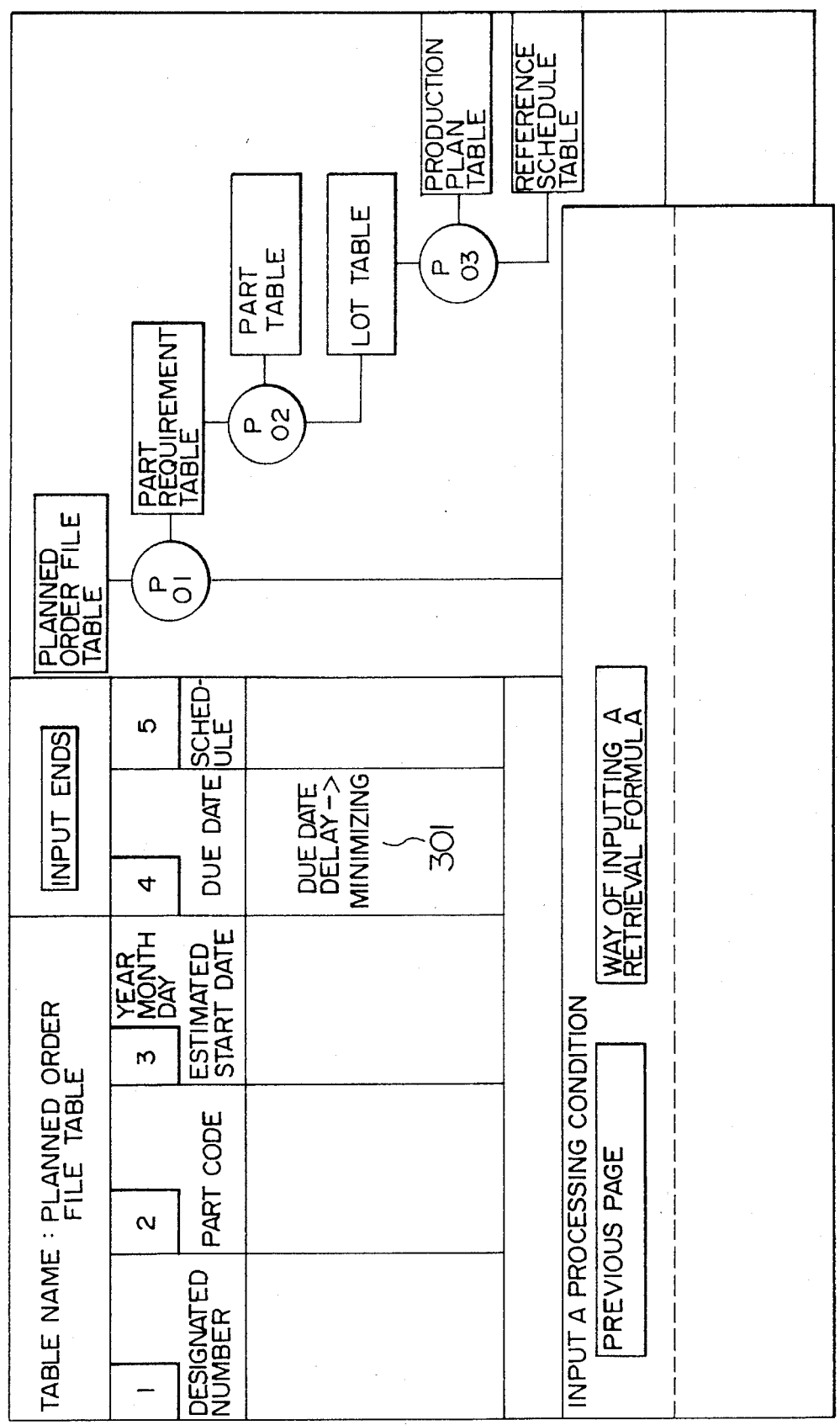
Figure 31:
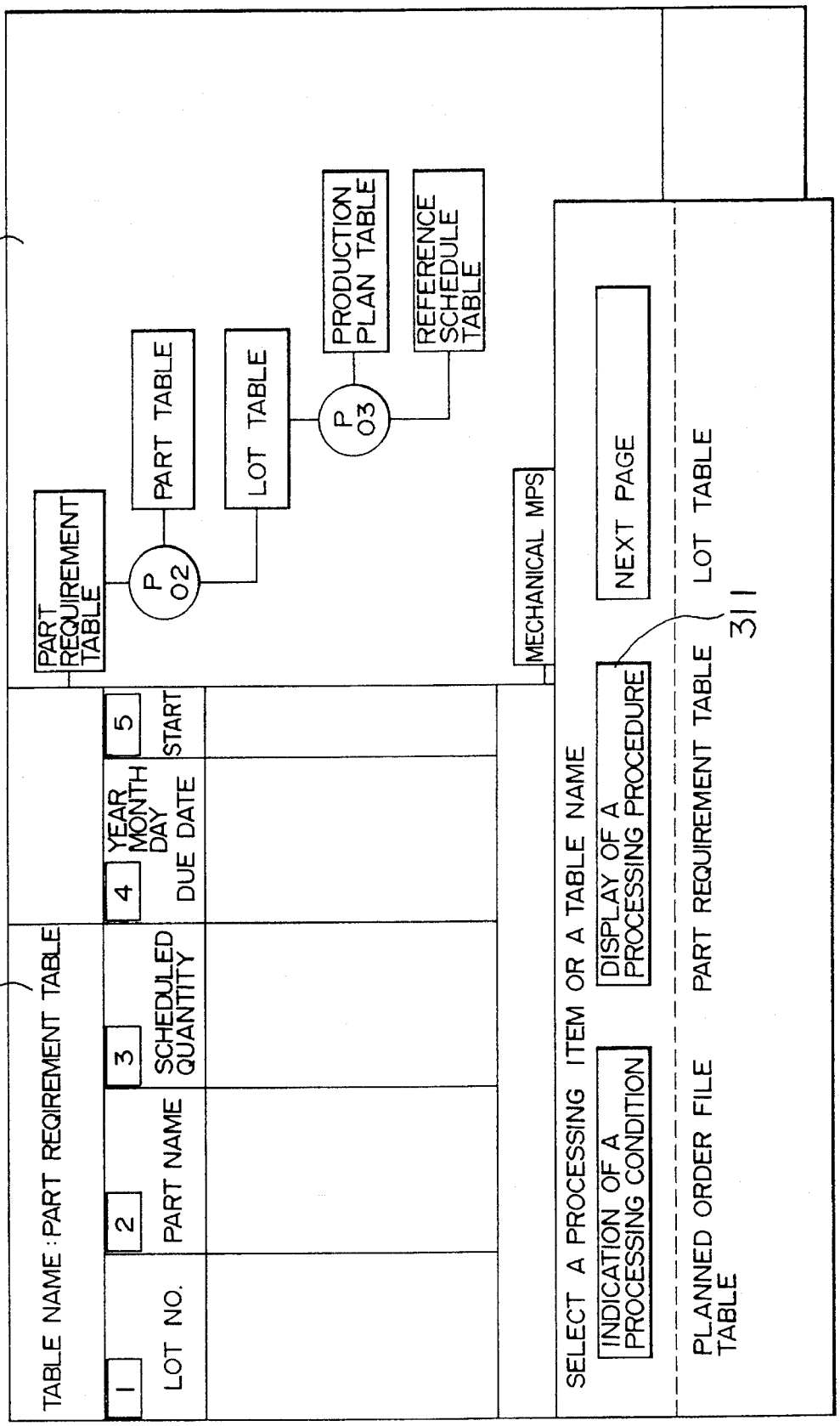
Figure 32:
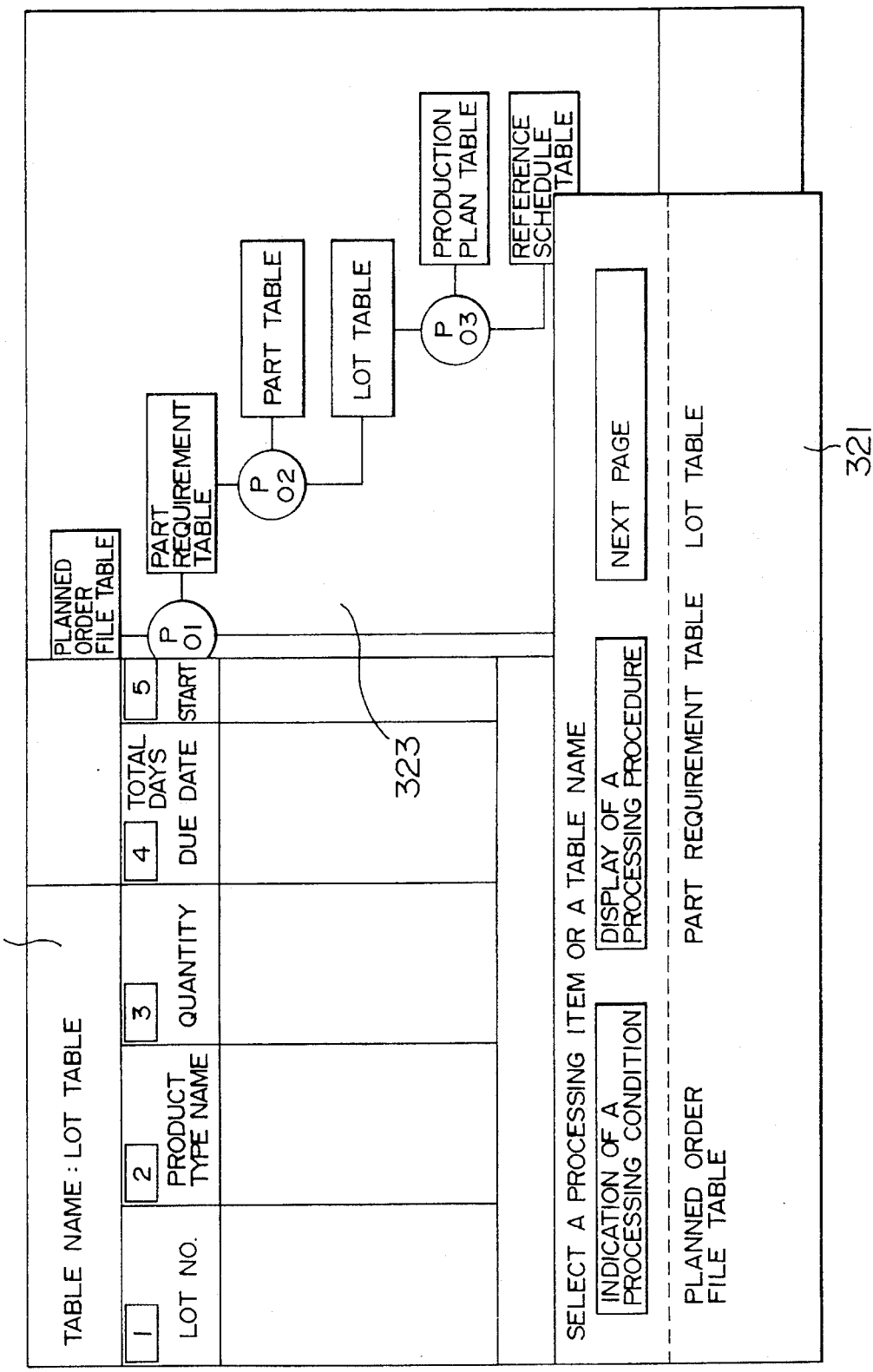
Figure 33:
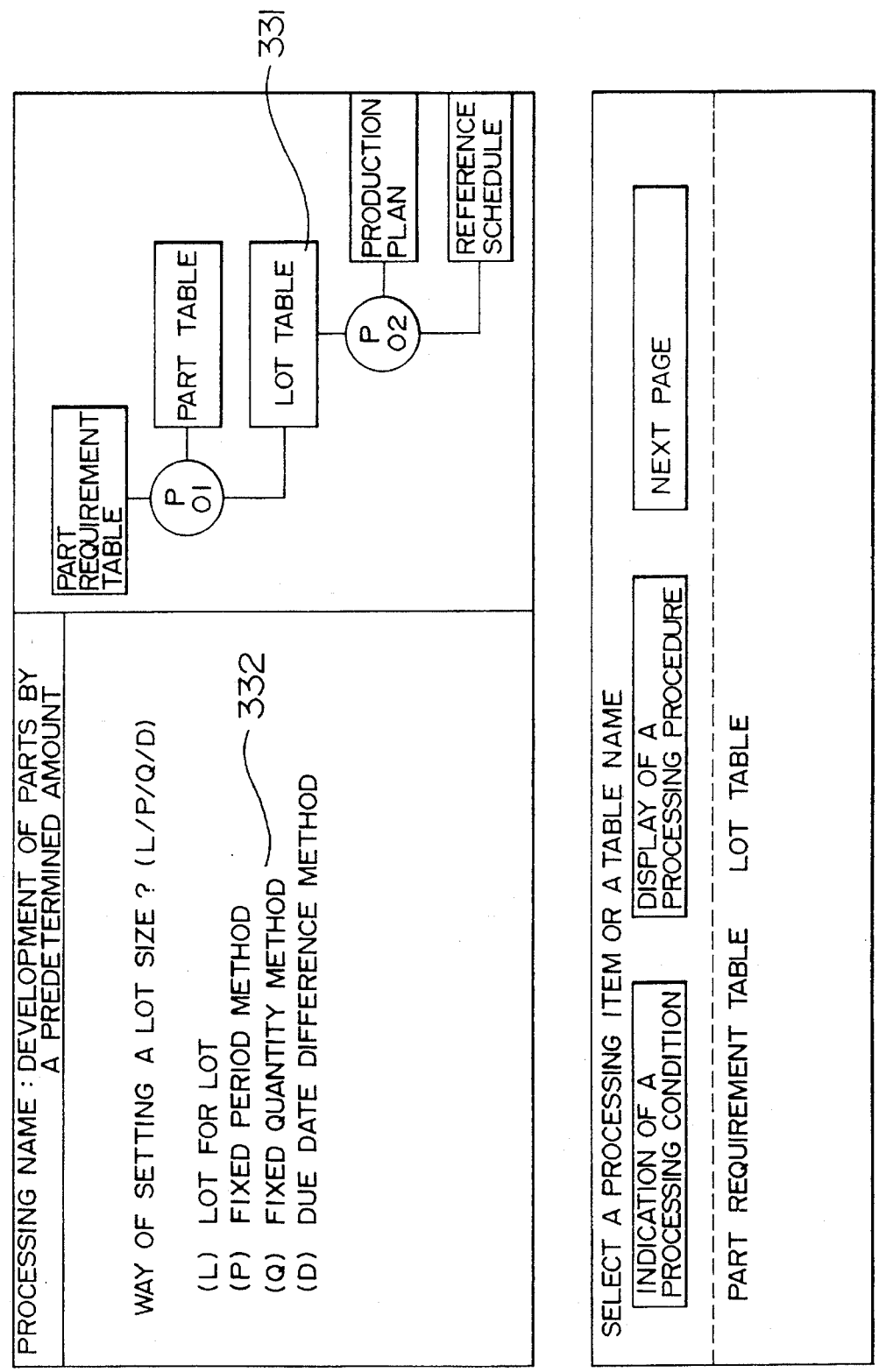
Figure 34:
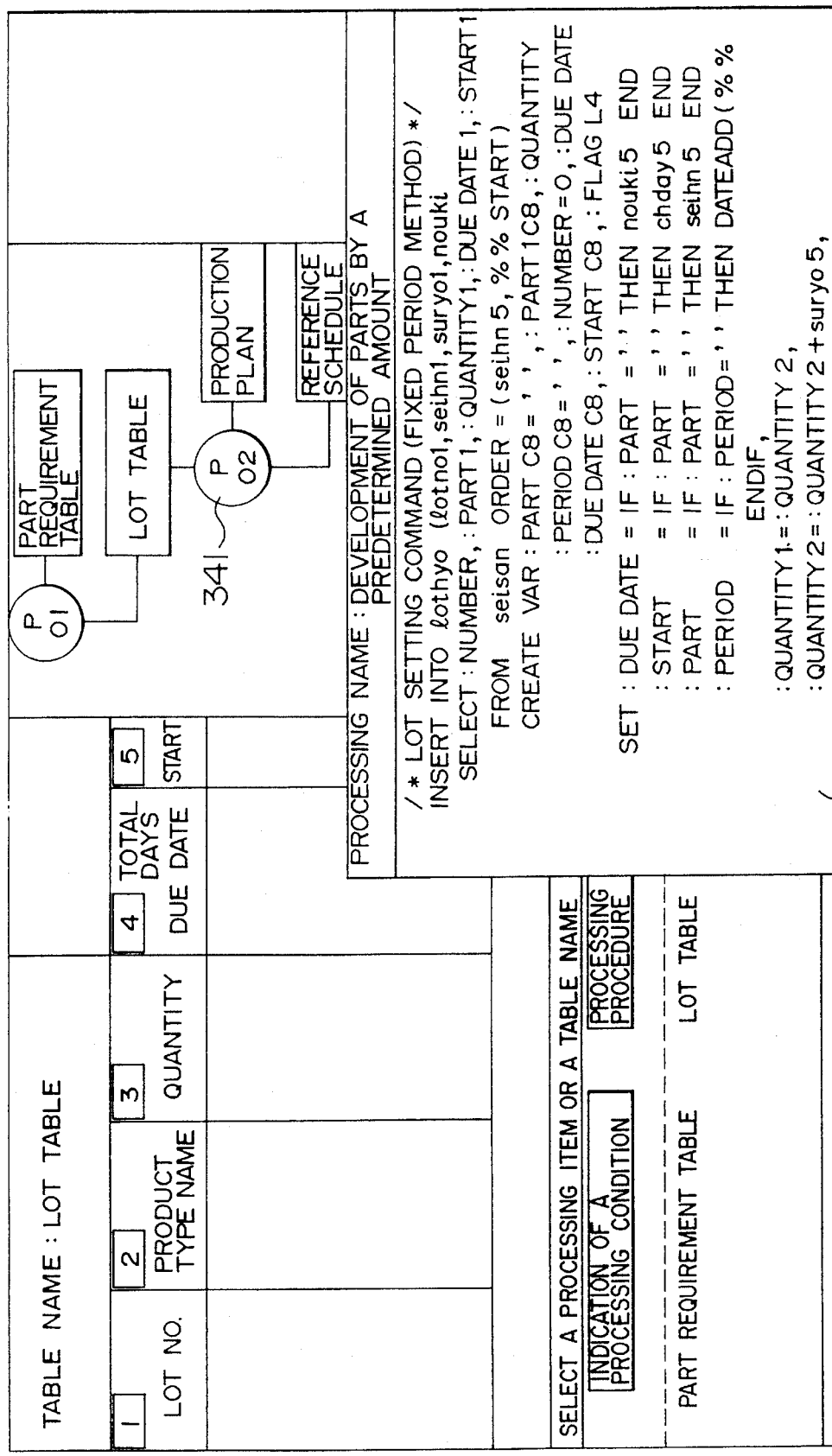
Figure 35:
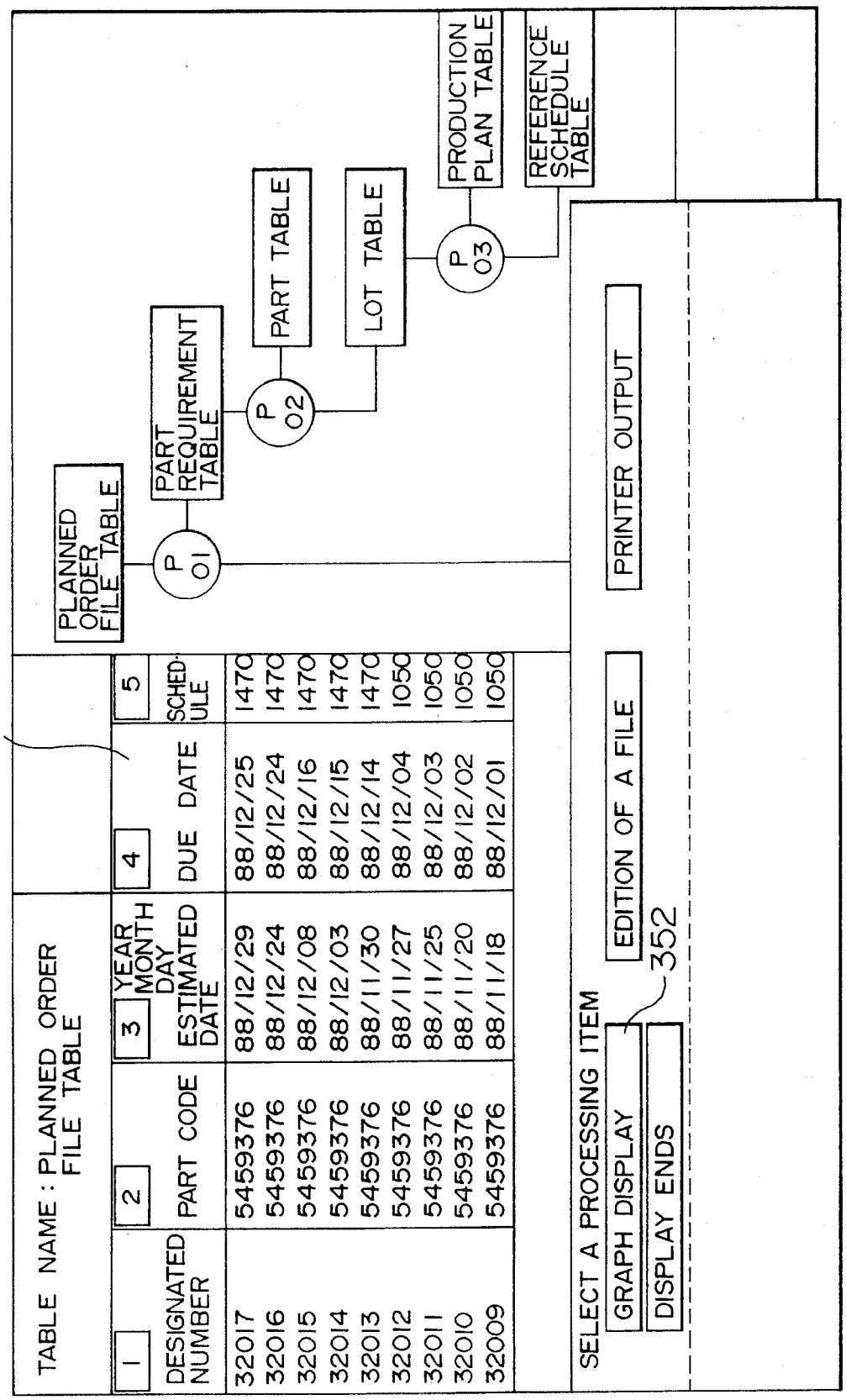
Figure 38:
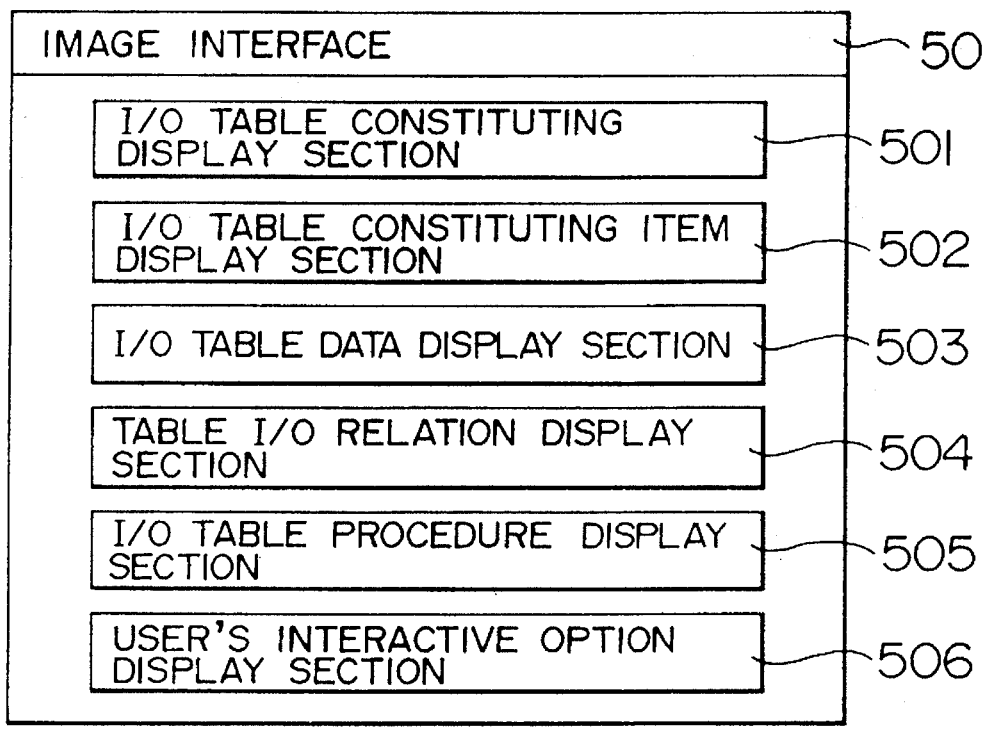
FIG. 38 is an explanatory view for illustrating detailed arrangement of an image interface.
Figure 39:
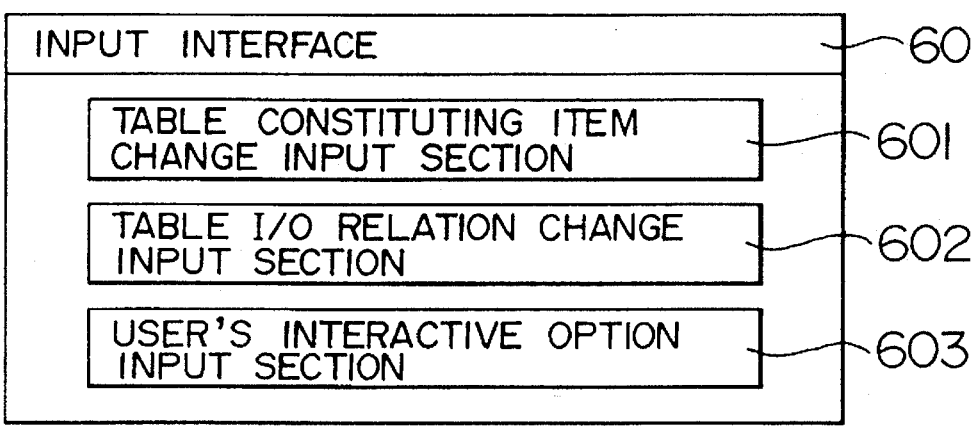
FIG. 39 is an explanatory view for illustrating detailed arrangement of an input interface.
Figure 40:
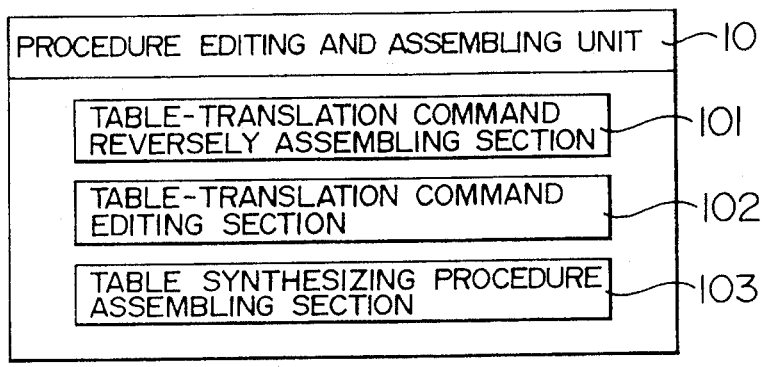
FIG. 40 is an explanatory view for illustrating detailed arrangement of an editing and assembling unit for the information processing procedure.
Figure 41:
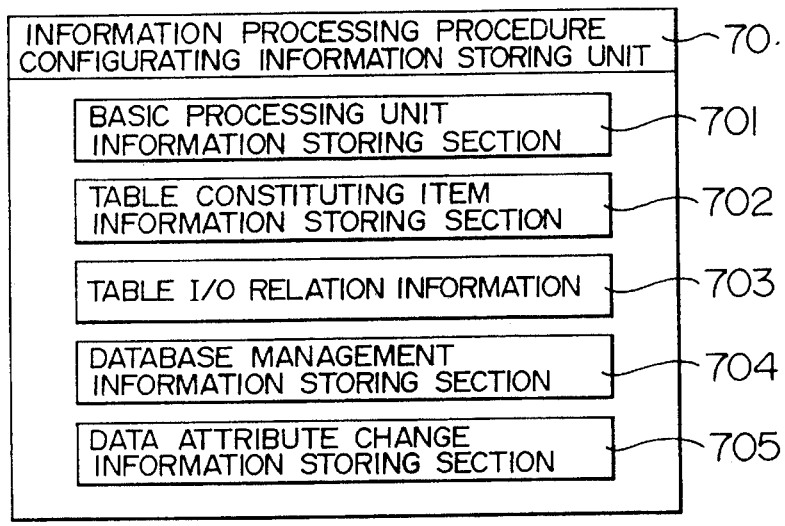
FIG. 41 is an explanatory view for illustrating detailed arrangement of a configuration information accumulating unit for the information processing procedure.
Figure 42:
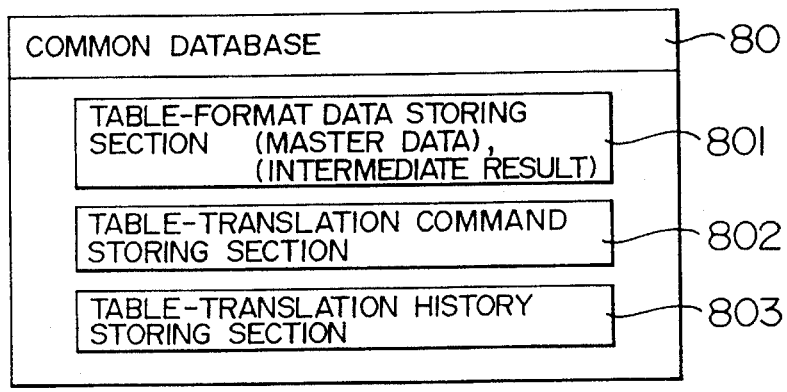
FIG. 42 is an explanatory view for illustrating detailed arrangement of a common database.

When calculating the planned order file table as shown in FIG. 28 about the production plan of parts, more particularly, what kind of parts, when each necessary part is started to be produced, and how many of parts (lot size) are produced in each production unit, as shown in FIGS. 29 to 34, if there are prepared two or more table-translation commands about the calculations of the planned order file table and the part requirement table, the system serves to display on the screen all the selectable table-translation commands as options (291, 332) so that the user can properly select the necessary table-translation command. In the illustration shown in FIG. 29, the user can select any one of the table-translation commands (291) corresponding to the four economical evaluation criteria. Further, the system serves to display the selected command so that the user can easily grasp what kind of item and the optimization of the selected command, as shown in 301 of FIG. 30. When calculating this planned order file table, as shown in FIGS. 31 and 32, there are displayed the table-translation commands about the part requirement table, that is, an input table. At this time, the system serves to display the content of the table translation about any output table appearing in the table-translating process on the screen sections (311, 321) so that the user can make sure that the four table-translation commands are allowed to be selected as shown in FIG. 33. By selecting the option 332 (selecting the table-translation command named as a fixed period method in the illustration shown in FIG. 33), the system serves to display the processing about the selected command performed for obtaining the lot table, as shown in 344 of FIG. 34, so that the user can make sure of whether or not the processing is done on the fixed period method.

Further, the items with the same names included in the input table and the output table may have respective attributes (unit, display format of a value) of the data. The means for automatically translating the data attribute in such a case will be described with reference to FIG. 36. The foregoing editing and assembling of the table-translation procedure proves whether or not the unit name of the translated table (output table) about the item is different from the unit name of the original table (input table) about the item. Hence, by accumulating the translation formula shown in FIG. 36 in the knowledge base (705), if the unit name about the item of the translated table (output table) is different from the unit name about the item of the original table (input table), the system is capable of selecting the necessary translation formula with an aid of each unit name, editing, assembling and executing the table-translation command based on the selected translation formula, and displaying the processed result together with the unit name of the translated table.

Moreover, the output data obtained by the foregoing procedure is stored in the common database together with the information about the table-translation process and its executable time so that the user can grasp the table-translation command used for obtaining the data and when it will be carried out in the future. This makes it possible to allow the system to perform precise information processing and prevent the database from being destroyed.

The present invention makes it possible to configure the detailed procedure only based on the output specification for the information processing required by the user in configuring and executing the software (information processing procedure). Further, the invention is also capable of reflecting the user's trial-and-error process on the configuration of the software, re-using the intermediate result in the information processing, performing the proper information processing and storing the necessary output in the proper storage unit only if the user (operator) indicates an output specification, making it possible for a non-expert to make effective use of the system. Further, the present invention provides means for receiving component items constituting the I/O table and the basic I/O processing names and means for searching the components of the information processing procedure with the aid of the received names and displaying the content of a series of information processing procedures about the input received by the operator. Hence, just by inputting a fragmental piece of information about the I/O table component item name and the basic I/O processing name, it is possible for the user to obtain the content of the information processing in the overall system without any aid of manuals or experts. It means that the user can understand the operating method of the system quickly. Moreover, the present system can easily provide two or more options having the same output table specification but different evaluation criteria for the information-processed result. Besides, the system can reduce the information processing time for the output table required by the operator and protect and precisely update the data file.

What is claimed is:

1. A computer-implemented information processing method for an information processing system including a capability for storage of data, said method comprising the steps of:

(A) dividing a processing procedure to be carried out by an information processing system into a plurality of basic processing blocks and storing said basic processing blocks in said information processing system;

(B) creating processing block information elements including a name for a respective processing executed within each of said processing blocks, an input table required by said processing block, and an output table outputted by said processing block for each of said processing blocks and storing said processing block information in corresponding information processing system;

(C) inputting data which identifies a user-specified desired output table format in said information processing system;

(D) selecting processing block information elements most compatible to said desired output table format in said information processing system;

(E) selecting other processing block information elements relevant to the input tables of said selected processing block information elements;

(F) repeating said step (E) to search for other processing block information elements for the desired output table format by tracing the flow of the processing from the output table back to the other processing block information elements; and (G) connecting the processing blocks from said searched for other processing block information elements in the sequence of the processing flow to build a procedure of said desired processing.

2. An information processing method according to claim 1, wherein:

in said step (B), the processing block information concerning each basic processing unit further includes item names to be outputted in the output table related to said processing unit;

in said step (C), said input data includes item names in said desired output table; and said step (D) includes the step of selecting the processing block information including the largest number of item names inputted at said step (C).

3. An information processing method according to claim 1, wherein said step (F), includes the step of sensing that there exists no information element concerning the input table or the processing name in said selected processing block information and determining that said searching should be terminated.

4. An information processing method according to claim 1, further comprising the steps of:
   (H) after executing step (F) and before executing said step (G), allowing a part of said procedure to be selected from a plurality of options; and
   (I) replacing the part of said processing with the option selected in said step (H) before executing said procedure.

5. An information processing method according to claim 1, further comprising the steps of:
   (H) before executing said step (G), allowing a parameter contained in said procedure to be changed; and
   (I) executing said procedure by using the parameter changed in said step (H).

6. An information processing method according to claim 4, wherein said step (H) is performed in an interactive manner through a display unit included in said information processing system.

7. An information processing method according to claim 5, wherein said step (H) is performed in an interactive manner through a display unit included in said information processing system.

8. An information processing system comprising:
   a data processing unit for executing information processing;
   an input unit connected to said data processing unit for receiving information inputted by an operator;
   a display unit connected to said data processing unit for displaying a processing result given by said data processing unit; and
   storage means connected to said data processing unit for storing a plurality of basic processing blocks composing a procedure to be processed by said processing unit and processing block information for each basic processing block, said processing block information containing information elements including a name of processing executed in each processing block, an input table required by the processing block, and an output table output by said processing block,
   wherein said data processing unit includes means for:
   (a) receiving data indicating a desired output table format inputted through said input unit;
   (b) selecting processing block information most compatible with said desired output table format;
   (c) selecting other processing block information from the information elements relevant to the input table of said selected processing block information;
   (d) repeating said step (c) to search for other processing block information elements for the desired output table by tracing the flow of the processing from the output table back to the other processing block information elements; and
   (e) connecting the processing blocks from said searched for other processing block information elements in the sequence of the processing flow to build the procedure of said desired processing.

9. An information processing system according to claim 8, wherein:
   in said storage unit, the processing block information for said each basic processing block includes item names to be outputted in an output table related to the processing block;
   the data input received through said input unit includes item names of said desired output table; and
   said data processing unit is used to select the processing block information including the largest number of items inputted through said input unit.

10. An information processing system according to claim 8, wherein said data processing unit further includes means for sensing that there exists no information element about the input table or the processing name in the selected processing information block and determines that said searching is to be terminated.

11. An information processing system according to claim 8, wherein said processing unit further comprises:
   (f) means for displaying a plurality of options in said display unit for the purpose of replacing a part of said procedure with one of said options;
   (g) means for selecting one of said options displayed on said display unit through said input unit;
   (h) means for replacing a part of said processing procedure with said selected option and executing the resulting procedure; and
   (i) means for displaying the executed result on said display unit.

12. An information processing system according to claim 8, wherein said processing unit further comprises:
   (f) means for receiving a parameter for changing the output condition of said desired output table through said input unit;
   (g) means for executing said procedure by using said parameter; and
   (h) means for displaying the executed result in said display unit.

13. An information processing method for an information processing system having a database, comprising the steps of:
   (A) storing a plurality of basic processing blocks in an information processing system, each of said processing blocks producing an output table from information included in at least two input tables;
   (B) storing an information block for each of said processing blocks in said information processing system, each of said information blocks including a name of a corresponding processing block, input tables in the corresponding processing block, and contents of an output table in the corresponding processing block;
   (C) inputting data which identifies a desired output table format in said information processing system from a user;
   (D) selecting an information block having an output table closest to said desired output table format inputted in said information processing system;
   (E) selecting other information blocks each having an output table closest to an input table of said selected information block;
   (F) successively selecting other information blocks each having an output table closest to an input table in a preceding information block until all the input tables find data in the database to thereby chain the selected information blocks from said closest output table to the data in said database;
   (G) combining the processing blocks corresponding to said selected information blocks in accordance with a state of chaining of said selected information blocks to one another;

(H) displaying an output table designated by the user on a display screen of a display device;

(I) inputting data for modifying contents of the output table being displayed from the user; and (J) modifying contents of at least one processing block corresponding to the output table being displayed on the basis of the inputted data in said step (I).

14. An information processing method according to claim 13, wherein:

in said step (B), each of said information blocks further includes item names to be outputted in the output table related to said processing block;

in said step (C), said input data includes item names in said desired output table; and said step (D) including a step of selecting an information block having as many item names as inputted at said step (C).

15. An information processing method according to claim 13, wherein said step (F) includes a step of terminating the successively selecting operation of other information blocks when all the input tables find the data in the database.

16. An information processing method according to claim 13, wherein modification of the contents in said step (J) includes a change of a processing condition in said at least one processing block.

17. An information processing method according to claim 13, wherein modification of the contents in said step (J) includes a change of a value in the output table being displayed.

18. An information processing system comprising:

a processing unit for executing information processing;

an input unit connected to said processing unit for receiving information inputted by a user;

a display unit connected to said processing unit for displaying a processing result given by said processing unit; and storage means connected to said processing unit for storing a plurality of basic processing blocks and a plurality of information blocks each corresponding to a respective basic processing block, each of said processing blocks producing an output table from information included in at least two input tables, and each of said information blocks including a name of a corresponding processing block, contents of input tables in the corresponding processing block, and contents of an output table in said corresponding processing block, wherein said processing unit includes means for:

(a) receiving data indicating a desired output table format inputted through said input unit by the user;

(b) selecting an information block having an output table closest to said desired output table format;

(c) selecting other information blocks each having an output table closest to an input table of said selected information block;

(d) successively selecting other information blocks each having an output table closest to an input table in a preceding information block until all the input tables reach data in the database to thereby chain the selected information blocks from said closest output table to the data in said database;

(e) combining the processing blocks corresponding to said selected information blocks in accordance with a state of chaining of said selected information blocks;

(f) displaying an output table designated by the user on a display screen of a display device;

(g) inputting data for modifying contents of the output table being displayed from the user; and (h) modifying contents of at least one processing block corresponding to the output table being displayed on the basis of inputted data in said step (J).

19. An information processing system according to claim 18, wherein:

in said storage unit, each of said information blocks includes item names to be outputted in the output table related to the processing block;

the data input received through said input unit includes item names of said desired output table; and said processing unit is used to select an information block having as many items names as inputted through said input unit.

20. An information processing system according to claim 18, wherein said processing unit further includes means for terminating the successively selecting operation of other information blocks when all the input tables reach the data in the database.

21. An information processing system according to claim 18, wherein modification of the contents executed by said means (h) includes a change of processing condition to be applied to said at least one processing block.

22. An information processing system according to claim 18, wherein modification of contents executed by said means (h) includes a change of a unit of a value in the output table being displayed.

* * * * *